United States Patent [10] Patent No.: US 12,393,386 B2
Gatland et al. [45] Date of Patent: Aug. 19, 2025

(54) DYNAMIC MARINE DISPLAY SYSTEMS AND METHODS

(71) Applicant: Raymarine UK Limited, Fareham (GB)

(72) Inventors: Christopher Daniel Gatland, Fareham (GB); Mark Rivers, Winchester (GB)

(73) Assignee: Raymarine UK Limited, Fareham (GB)

(*) Notice: Subject to any disclaimer, the term of this patent is extended or adjusted under 35 U.S.C. 154(b) by 823 days.

(21) Appl. No.: 17/556,047

(22) Filed: Dec. 20, 2021

(65) Prior Publication Data

US 2022/0374186 A1 Nov. 24, 2022

Related U.S. Application Data

(60) Provisional application No. 63/130,320, filed on Dec. 23, 2020.

(51) Int. Cl.
*G06F 3/14* (2006.01)
*B63B 49/00* (2006.01)
(Continued)

(52) U.S. Cl.
CPC ............ *G06F 3/1423* (2013.01); *B63B 49/00* (2013.01); *B63H 25/38* (2013.01); *G05D 1/0206* (2013.01);
(Continued)

(58) Field of Classification Search
CPC .............. G06F 3/1423; G06F 3/04817; G06F 3/04847; G06F 3/0488; B63B 49/00; B63H 25/38; G05D 1/0206
See application file for complete search history.

(56) References Cited

U.S. PATENT DOCUMENTS 6,335,725 B1  1/2002  Koh et al.
7,143,363 B1* 11/2006 Gaynor .................... B63J 99/00
                                                              701/487
(Continued)

FOREIGN PATENT DOCUMENTS

WO  WO 2011/149457  12/2011
WO  WO 2014/107288   7/2014

OTHER PUBLICATIONS

Rose Point ECS Reference Manual, taken from https://www.rosepoint.com/support/rose-point-ecs-4/Rose%20Point%20ECS%204%20Reference.pdf, published 2019, pp. 1-11 (Year: 2019).*

*Primary Examiner* — William L Bashore
*Assistant Examiner* — Gregory A Distefano
(74) *Attorney, Agent, or Firm* — Haynes and Boone, LLP

(57) ABSTRACT

Techniques are disclosed for systems and methods to provide dynamic display systems for mobile structures. A dynamic marine display system includes a user interface comprising a primary display and secondary display, where the secondary display is disposed along and physically separate from an edge of the primary display, and where the secondary display comprises a touch screen display configured to render pixelated display views and receive user input as one or more user touches and/or gestures applied to a display surface of the secondary display. A logic device is configured to receive user selection of an operational mode associated with the user interface and/or the mobile structure and render a primary display view via the primary display and/or a secondary display view via the secondary display corresponding to the received user selection and/or operational mode.

20 Claims, 22 Drawing Sheets

(51) Int. Cl.
  *B63H 25/38*    (2006.01)
  *G05D 1/00*    (2006.01)
  *G06F 3/04817*    (2022.01)
  *G06F 3/04847*    (2022.01)
  *G06F 3/0488*    (2022.01)
  *G06F 3/0482*    (2013.01)

(52) U.S. Cl.
  CPC ...... *G06F 3/04817* (2013.01); *G06F 3/04847* (2013.01); *G06F 3/0488* (2013.01); *G06F 3/0482* (2013.01)

(56) References Cited

U.S. PATENT DOCUMENTS

| | | | |
|---|---|---|---|
| 7,683,771 B1* | 3/2010 | Loeb | B63B 49/00 |
| | | | 701/1 |
| 8,441,460 B2 | 5/2013 | Chang | |
| 9,489,080 B2 | 11/2016 | Seo et al. | |
| 2012/0072109 A1* | 3/2012 | Waite | G01C 21/3679 |
| | | | 701/431 |
| 2014/0071059 A1* | 3/2014 | Girault | B63B 49/00 |
| | | | 345/173 |
| 2014/0176454 A1 | 6/2014 | Yu et al. | |
| 2014/0181497 A1* | 6/2014 | Dominicus | G06F 9/4406 |
| | | | 713/2 |
| 2016/0357298 A1* | 12/2016 | Kim | G06F 3/04883 |
| 2017/0010771 A1* | 1/2017 | Bernstein | G06F 3/1423 |
| 2017/0038771 A1* | 2/2017 | Green | G05D 1/0033 |
| 2020/0142717 A1* | 5/2020 | Boykov | G06F 9/547 |
| 2021/0389765 A1* | 12/2021 | Behrendt | G06F 3/04815 |

\* cited by examiner

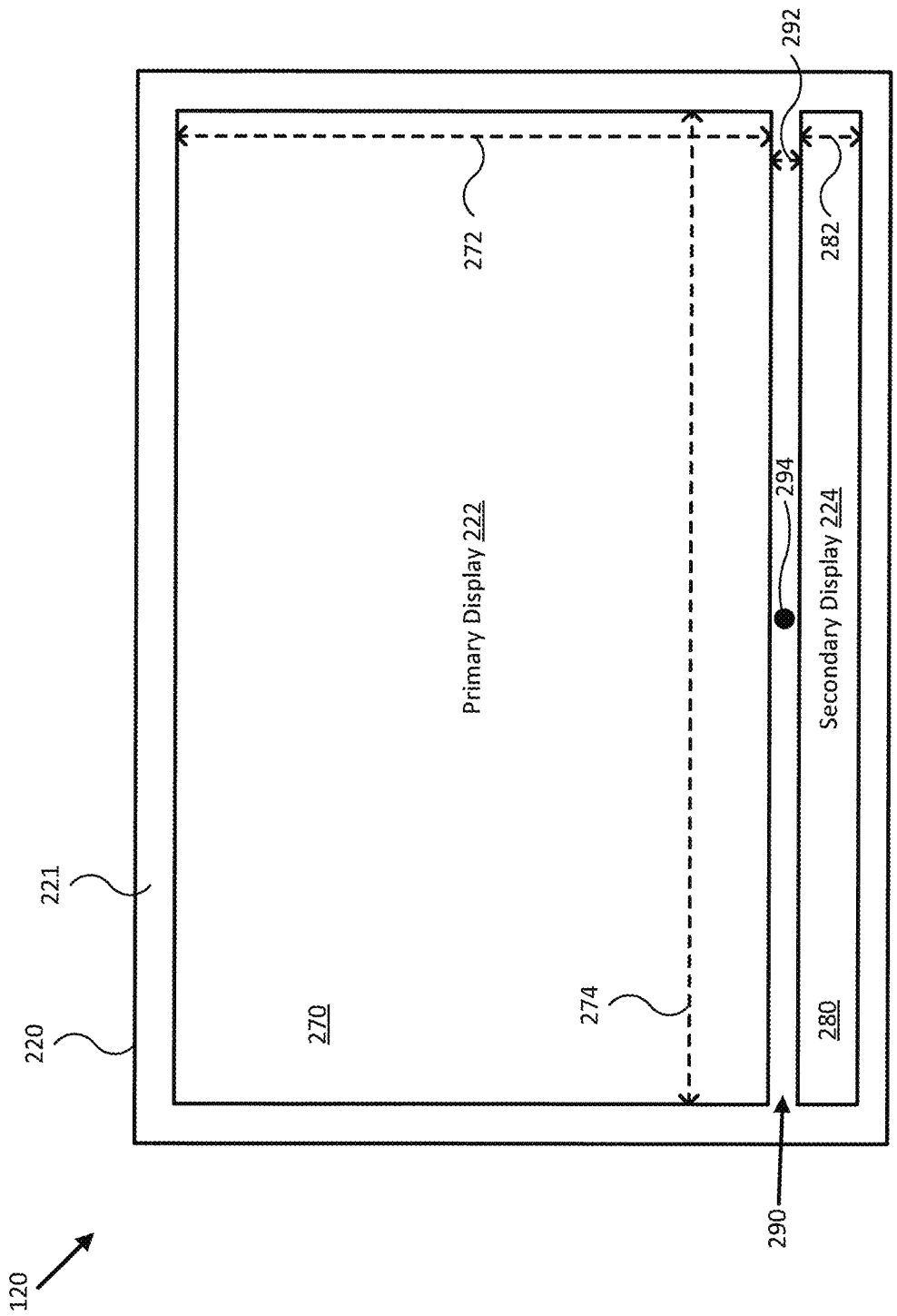

DYNAMIC MARINE DISPLAY SYSTEMS AND METHODS

CROSS-REFERENCE TO RELATED APPLICATIONS

This application claims the benefit of and priority to U.S. Provisional Patent Application No. 63/130,320 filed Dec. 23, 2020 and entitled "DYNAMIC MARINE DISPLAY SYSTEMS AND METHODS," which is incorporated herein by reference in its entirety.

TECHNICAL FIELD

One or more embodiments of the invention relate generally to display systems and more particularly, for example, to systems and methods for dynamic marine displays.

BACKGROUND

Conventional marine displays are used to display bathymetric data (e.g., to detect underwater hazards and/or find fish), provide watercraft status to pilots, and/or otherwise assist in navigation by rendering imagery of the area about a watercraft and providing a mechanism for watercraft and/or watercraft system control. Particularly with respect to marine displays, there is a constant challenge in balancing ease of access to key features with compromises in terms of screen real estate and dedicated physical buttons. At the same time, consumer market pressures and convenience dictate easier to use systems that include a variety of user-defined features and that produce high quality and uncluttered display views. Thus, there is a need for an improved methodology to provide marine display systems, particularly in the context of providing easily intuited informational and/or control imagery important to general operation of a watercraft.

SUMMARY

Techniques are disclosed for systems and methods to provide dynamic marine displays for watercraft and/or other mobile structures. A dynamic marine display system may be implemented as a user interface for such mobile structures and include and/or be integrated with imaging devices, sonar transducer assemblies, orientation and/or position sensors (OPSs), and logic devices in communication with the sonar transducer assemblies, imaging devices, and OPSs. User input and/or other navigation data provided to the dynamic marine display system may be used to adjust a steering actuator, a propulsion system thrust, and/or other operational systems of the mobile structure. In various embodiments, a dynamic marine display system may include one or more orientation sensors, position sensors, gyroscopes, accelerometers, and/or additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a user interface for a mobile structure including a primary display and secondary display, where the secondary display is disposed along and physically separate from an edge of the primary display, and where the secondary display comprises a touch screen display configured to render pixelated display views and receive user input as one or more user touches and/or gestures applied to a display surface of the secondary display. The system may include a logic device configured to communicate with the user interface and receive user selection of an operational mode associated with the user interface and/or the mobile structure via the one or more user touches and/or gestures applied to the secondary display surface, and to render a primary display view via the primary display and/or a secondary display view via the secondary display corresponding to the received user selection and/or operational mode associated with the user interface and/or the mobile structure.

In another embodiment, a method may include receiving user selection of an operational mode associated with a mobile structure and/or a user interface for the mobile structure, where the user interface includes a primary display and secondary display, the secondary display is disposed along and physically separate from an edge of the primary display, the secondary display comprises a touch screen display configured to render pixelated display views and receive user input as one or more user touches and/or gestures applied to a display surface of the secondary display, and the user selection is received via the one or more user touches and/or gestures applied to the secondary display surface. The method may also include rendering a primary display view via the primary display and/or a secondary display view via the secondary display, each corresponding to the received user selection and/or operational mode associated with the user interface and/or the mobile structure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2A illustrates a diagram of a user interface for a dynamic marine display system in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
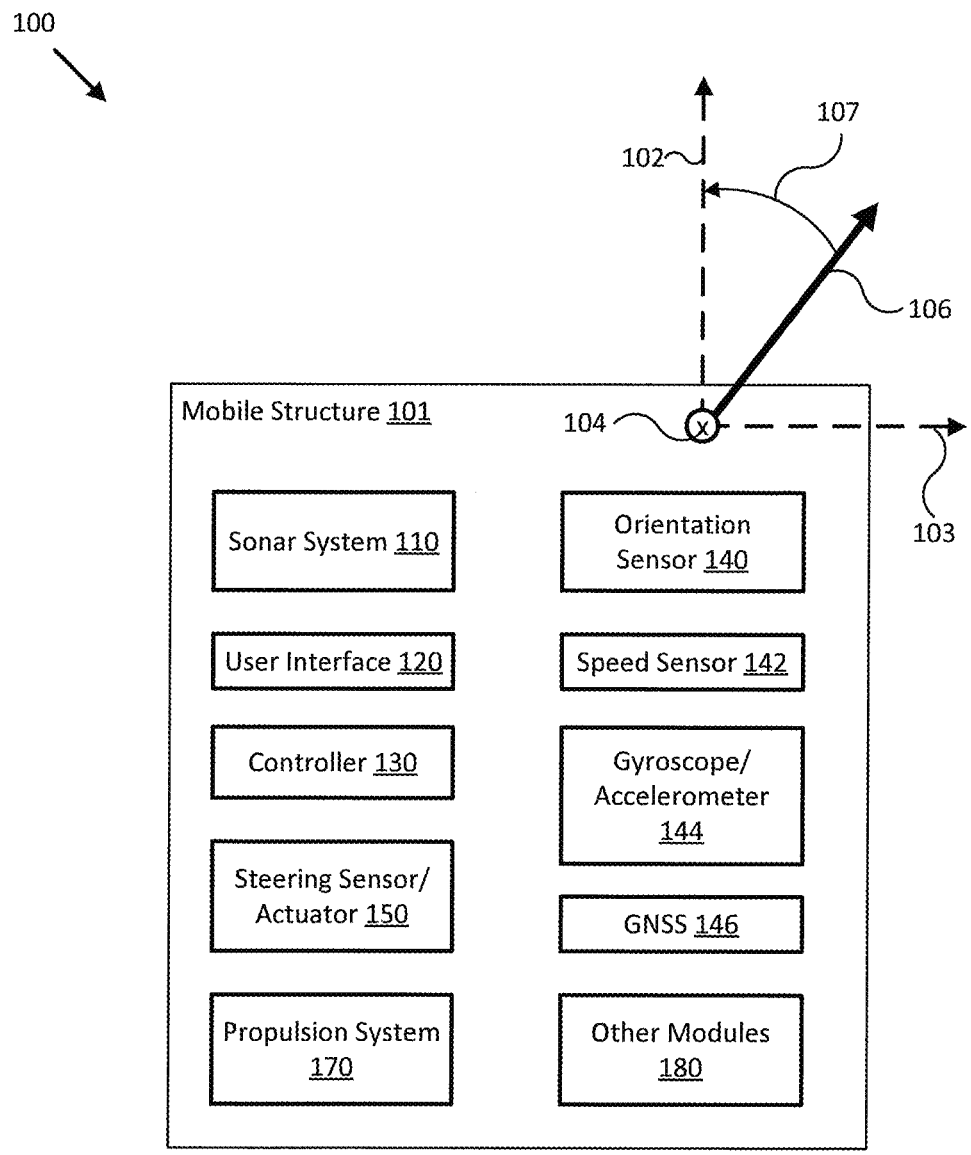
FIG. 1A illustrates a block diagram of a dynamic marine display system in accordance with an embodiment of the disclosure.

In accordance with various embodiments of the present disclosure, dynamic marine display systems may include a user interface with a primary display and secondary display, where the secondary display is disposed along and physically separate from an edge of the primary display, and where the primary and secondary displays are a touch screen displays configured to render pixelated display views and receive user input as one or more user touches and/or gestures. Embodiments may be configured to receive user selection of an operational mode associated with the user interface and/or an associated mobile structure via the one or more user touches and/or gestures and to render a primary display view via the primary display and/or a secondary display view via the secondary display, each corresponding to the received user selection and/or operational mode associated with the user interface and/or the mobile structure In marine electronics, there is a constant challenge of balancing ease of access to key features with compromises in terms of screen real-estate and dedicated physical buttons. Onscreen buttons take up space that could be better used to show application data. Dedicated physical buttons are not always useful to all users (e.g., a pilot key has no value for a user without an autopilot). Embodiments described herein solve this problem as follows. A smaller secondary display is available underneath a primary display (but on the same face/plane) and provides: access to controls/data independently from the context currently shown on the main display; access to frequently used, but context independent controls/data from anywhere in the interface (e.g., waypoint placement, audio controls, pilot controls); (low-power) access to data/controls when the primary display is in power-saving mode; a dedicated area to show specific system-to-user messages/alerts etc.; background status information unrelated to the main screen use (e.g., chart update in progress); user configuration of what supplementary controls/data are made available, per display, to avoid repetition/redundancy on a multi-display dashboard; control sets which can be tailored to the specific capabilities of the system, showing only those controls which are relevant; additional controls/data to save using main screen real-estate; increased flexibility for customized branding for different users/customers.

Embodiments may include an imaging device, a radar system, and/or a sonar system including one or more sonar transducer assemblies, orientation sensors, gyroscopes, accelerometers, position sensors, and/or speed sensors providing measurements of an orientation, a position, an acceleration, and/or a speed of the imaging device, the radar system, and/or the sonar transducer assemblies, and/or a coupled mobile structure. For example, the sensors may be mounted to or within the mobile structure (e.g., a watercraft, aircraft, motor vehicle, and/or other mobile structure), or may be integrated with the imaging device and/or the sonar transducer assemblies.

Embodiments of the present disclosure produce dynamic secondary display views that supplement informational and interactive display components of the primary display and help to declutter display views while providing additional functionality, thereby providing display views that are more intuitive and easier to interpret and use than those provided by conventional systems and/or methods. Moreover, embodiments help reduce power usage by eliminating unnecessary primary display power draws when the primary display is unneeded.

FIG. 1A illustrates a block diagram of system 100 in accordance with an embodiment of the disclosure. In various embodiments, system 100 may be adapted to measure an orientation, a position, an acceleration, and/or a speed of mobile structure 101, sonar system 110, and/or user interface 120. System 100 may then use these measurements to form various display views of chart data corresponding to a route of mobile structure 101 and/or sonar data provided by sonar system 110. In some embodiments, system 100 may display resulting data and/or imagery to a user through user interface 120, and/or use the data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global navigation satellite system (GNSS) receiver 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943, 170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on a chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In particular, user interface may be implemented as a component of a dynamic marine display system including a primary display and a smaller secondary display configured to offload controls and/or information that would otherwise clutter the primary display, as described herein. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global positioning satellite (GPS) receiver and/or other GNSS receiver or similar device capable of determining absolute and/or relative position of mobile structure 101 (e.g., or an element of mobile structure 101, such as sonar system 110 and/or user interface 120) based on wireless signals received from space-born and/or terrestrial sources, for example, and capable of providing such measurements as sensor signals that may be communicated to various devices of system 100. In some embodiments, GNSS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101 and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
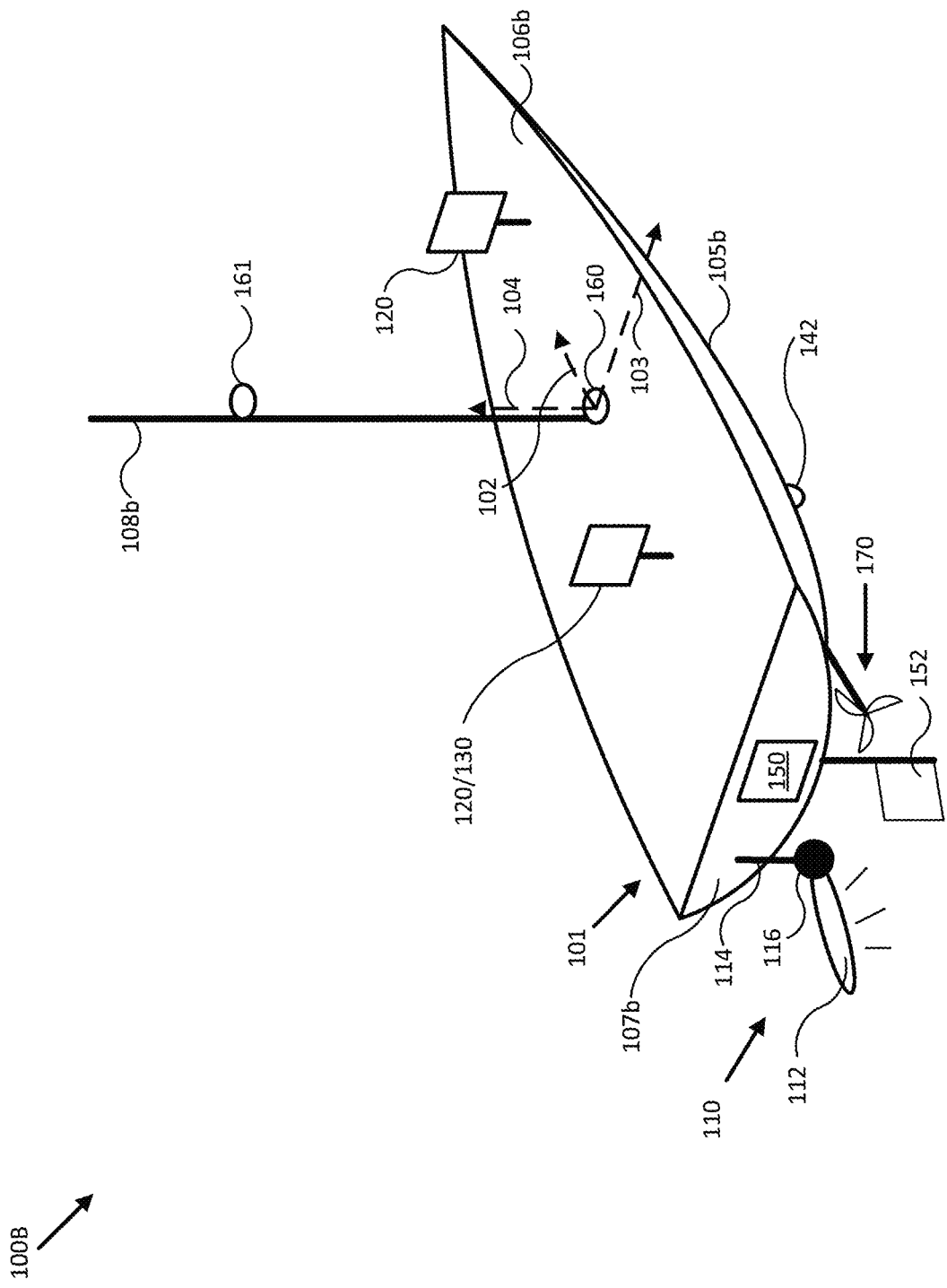
FIG. 1B illustrates a diagram of a dynamic marine display system in accordance with an embodiment of the disclosure.

FIG. 1B illustrates a diagram of system 100B in accordance with an embodiment of the disclosure. In the embodiment shown in FIG. 1B, system 100B may be implemented to provide chart, sonar, and/or other data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GNSS 146), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle. As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 and/or mobile structure 101 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GNSS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

FIG. 2A illustrates a diagram of user interface 120 for dynamic marine display system 100 in accordance with an embodiment of the disclosure. More specifically, FIG. 2A illustrates a dynamic marine display 220 including a primary display 222 supplemented by a secondary display 224, which may include a relatively narrow multi-purpose color touch panel, below primary display 222. Several specific applications of secondary display 224 are described, which control both system-wide functions and also features which interact directly with the content shown on primary display 222. In the embodiment shown in FIG. 2A, user interface 120 is implemented as a dynamic marine display/multifunction display (MFD) 220 including a primary display 222 and a physically separate secondary display 224. In some embodiments, primary and second displays 222, 224 may be rectangular and coplanar, and secondary display 224 may be disposed along a lower or bottom long edge of primary display 222, so that typical touch use of secondary display 224 does not block view of primary display 222. In specific embodiments, primary display 222 may be implemented with a W:H ratio of 1:1, 4:3, 16:9, and/or any such ratios between 9:16 and 16:9.

In FIG. 2A, user interface 120 may include a bezel 221 about the exterior of primary display 222 and secondary display 224, and primary display 222 and secondary display 224 may be physically separated according to spacer width 292 by interstitial spacer 290, which may in some embodiments be formed from the same material as bezel 221. In some embodiments, controller 130 may be configured to deactivate secondary display 224 so that is appears to disappear into bezel 221 and only becoming visible again when required to perform a function, such as render an alert or message. Primary display 222 is shown with display surface 270 having width 274 and height 272, and secondary display 224 is shown with height 282 and a width that is equal to primary display width 274. In various embodiments, height 282 of secondary display 224 may be between approximately one fifth and one twenty-fifth height 272 of primary display 222.

In various embodiments, primary display 222 and secondary display 224 may be implemented using the same display technology, but where secondary display 224 is smaller (e.g., in area) than primary display 222. In some embodiments, secondary display 224 may be implemented according to a different display technology, such as a relatively low power pixel based display technology, such as an e-ink display. More generally, either or both primary display 222 and secondary display 224 may be implemented as touch screen displays configured to render pixelated display views and receive user input as one or more user touches and/or gestures applied to display surfaces 270 and 280. In some embodiments, either or both primary display 222 and secondary display 224 may be implemented with touch sensors configured to detect proximity as well as touch. In other embodiments, user interface 120 may be implemented with an optional separate proximity detector 294 configured to detect proximity of a user's hand or selection stylus, for example, or absence of such proximity, as described herein.

Figure 2B:
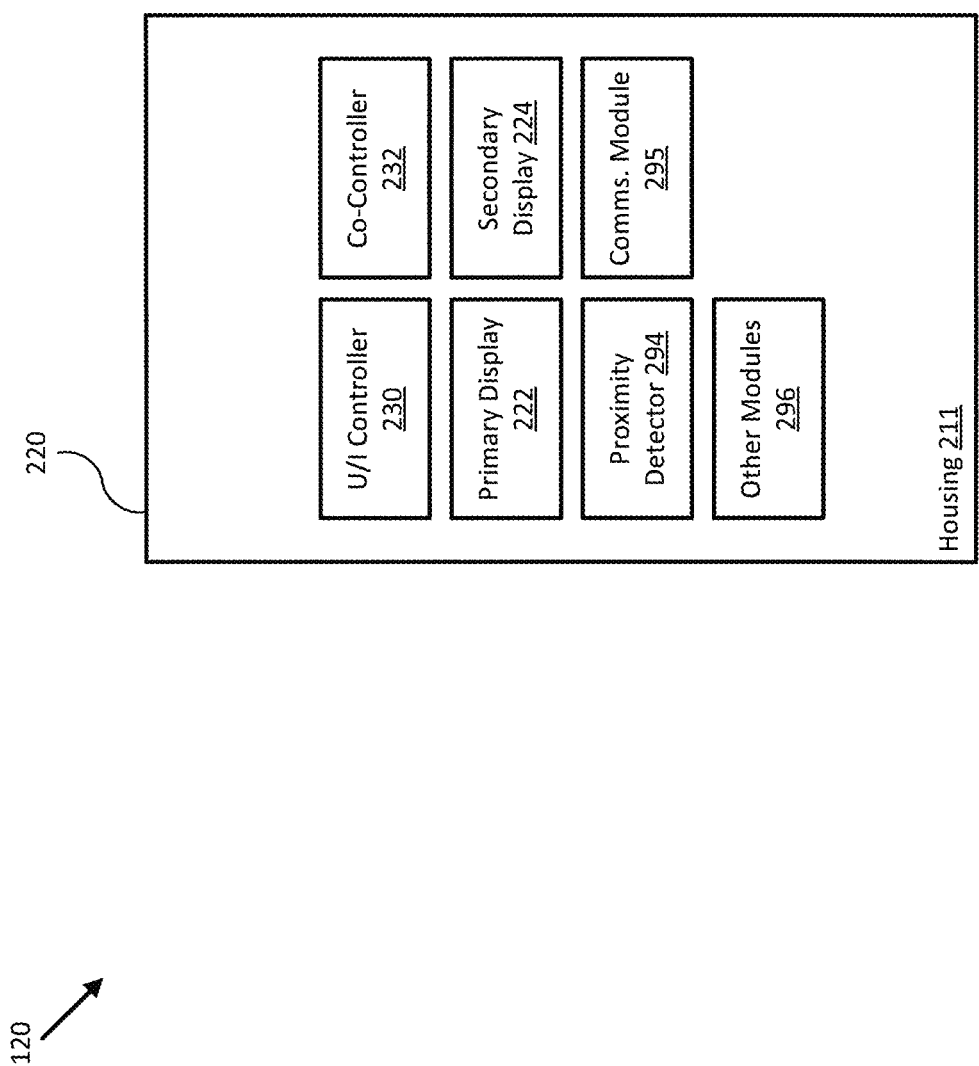
FIG. 2B illustrates a block diagram of a user interface for a dynamic marine display system in accordance with an embodiment of the disclosure.

FIG. 2B illustrates a block diagram of user interface 120 for dynamic marine display system 100 in accordance with an embodiment of the disclosure. In the embodiment shown in FIG. 2B, user interface 120 is implemented as dynamic marine display/MFD 220 with primary display 222 physically separate from secondary display 224, along with one or more controllers (e.g., user interface controller 230 and/or co-controller 232), proximity detector 294, communications module 295, and other modules 296 facilitating operation of system 100 all disposed within or coupled to a common housing 211. In some embodiments, one or more of the devices shown in FIG. 2B may be integrated with a remote user interface and communicate with remaining devices within user interface 120 through one or more wired and/or wireless communication links.

User interface controller 230 and/or co-controller 232 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of user interface 120 and/or system 200, for example, similar to controller 130. In some embodiments, user interface controller 230 and controller 130 of FIG. 1A may be integrated together into a single controller. In various embodiments, user interface controller 230 may be tasked with overseeing general operation of user interface 120, generating sonar imagery from sonar data, correlating sensor data with sonar data/imagery, communicating operational parameters and/or sensor information with other devices through wired and/or wireless communication links supported by communications module 295, and/or other general or high-level system operations of system 100. In such embodiments, co-controller 232 may be implemented with relatively low power circuitry capable of generating display views for secondary display 224 while U/I controller 230 and/or other elements of user interface 120 are unpowered or in a low power or standby mode.

In a specific embodiment, co-controller 232 may be configured to control operation of secondary display 224 while user interface 120 is unpowered or in a low power or standby mode, and to hand off control of secondary display 224 to controller 230 after user interface is powered on or exits the low power or standby mode and enters an operational mode (e.g., where both primary and secondary displays 222 and 224 are powered and able to receive user touch input, as described herein). In some embodiments, co-controller 232 may be configured to use communications module 295 to communicate and/or pair with a remote personal electronic device, such as a smart phone, to authenticate a user prior to allowing user touch input applied to secondary display 224 to power user interface 120, for example, using any one or combination of a variety of different wireless communication protocols and/or technologies, including near field communication (NFC), Bluetooth low energy (BTLE), WiFi, and/or other wireless communication protocols. In various embodiments, U/I controller 230 and co-controller 232 may be integrated together, for example, or may be implemented in a distributed manner across a number of individual controllers/logic devices.

Proximity detector 294 may be implemented as an ultrasonic or radio frequency transducer or other detector element configured to detect the presence of a user or a user appendage (e.g., finger or hand) within approximately six inches of user interface 120, for example. Communications module 295 may be implemented as one or more amplifiers, modulators, phase adjusters, beamforming components, digital to analog converters (DACs), analog to digital converters (ADCs), various interfaces, and/or other analog and/or digital components configured to transmit and/or receive signals, for example, in order to facilitate wired and/or wireless communications between U/I controller 230 and other elements of FIGS. 1A and/or 1B, using any of the wired and/or wireless communication techniques and/or protocols described herein and/or other wired and/or wireless communication techniques and/or protocols. In some embodiments, communications module 295 may be implemented with and/or coupled to an internal antenna and/or an external antenna to facilitate wireless transmissions according to a particular radiation pattern and/or polarization.

Other modules 296 may include other and/or additional sensors, sensor arrays, actuators, logic devices, communications modules/nodes, power supply and/or distribution components, and/or user interface devices used to provide additional environmental information and/or configuration parameters, for example. In some embodiments, other modules 296 may include a visible spectrum camera, an infrared camera, and/or other environmental sensors providing measurements and/or other sensor signals that can be displayed to a user (e.g., using primary display 222 and/or secondary display 224) and/or used by other devices of user interface 120 (e.g., U/I controller 230) to provide operational control of user interface 120 and/or system 100.

Figure 3A:
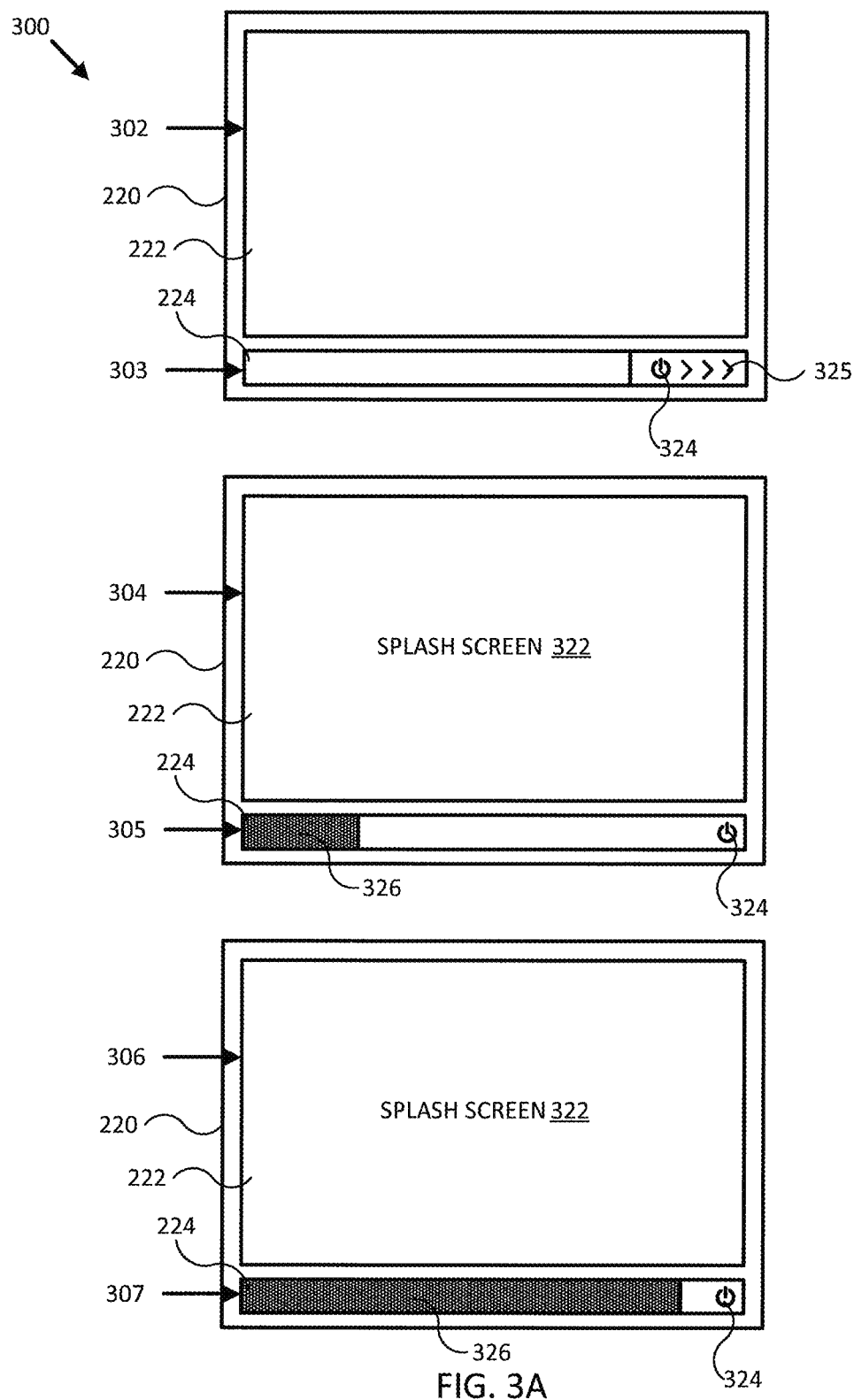
FIGS. 3A-B illustrate display views and/or animations rendered by a user interface for a dynamic marine display system in accordance with an embodiment of the disclosure.
Figure 3B:
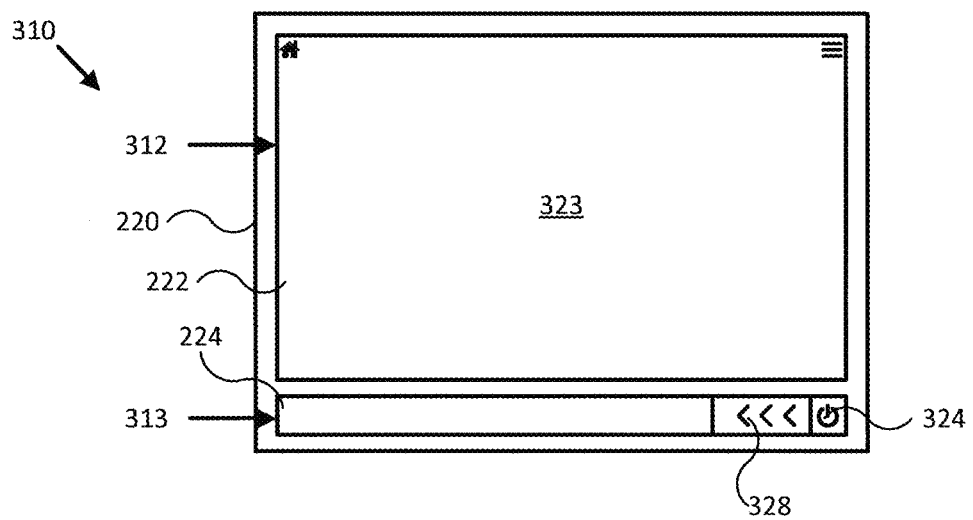

FIGS. 3A-B illustrate display views and/or animations rendered by a user interface for dynamic marine display system 100 in accordance with an embodiment of the disclosure. For example, FIG. 3A shows boot animation/display views 300 including a series of primary/boot display views 302, 304, 306 and a corresponding series of secondary/boot display views 303, 305, and 307, but where primary display 222 isn't required for the boot process, thereby either reducing power usage or allowing primary display 222 to be used for branding or to display selected or more relevant information. As shown in FIG. 3A, primary display view 302 provided by primary display 220 is blank or includes a powered down graphic or state typical before booting. Secondary display view 303 is mostly blank (e.g., to save power), but includes power selector icon 324.

To initiate boot of user interface 120 and/or system 100, a user may select power selector icon 324 by touch-holding it for a predetermined time, for example, or may initiate a swipe gesture or drag to the right (in FIG. 3A) at power selector icon 324, which may trigger slide animation 325 corresponding to the appropriate swipe gesture. Controller 130 may be configured to receive such touch or gesture from dynamic marine display 220/user interface 120 and render display view 304 via primary display 222, which may include boot graphic 322 (e.g., a splash screen or other boot information) associated with user interface 120 and/or mobile structure 101. Controller 130 may be configured to render secondary display view 305 including animated progress bar 326 and/or power selector icon 324 displaced to the far edge (right or left) of secondary display 224, which allows primary display 222 to display content other than boot progress while user interface 120/system 100 boots. Controller 130 may continue through the boot process and render completed animated progress bar 326 as shown in secondary display view 307, while rendering boot graphic 322 and/or other information via display view 306.

FIG. 3B shows shutdown animation/display view 310. To initiate shutdown of user interface 120 and/or system 100, a user may select power selector icon 324 by touch-holding it for a predetermined time, for example, or may initiate a swipe gesture or drag to the left (in FIG. 3B) at power selector icon 324, which may trigger slide animation 328 corresponding to the appropriate swipe gesture. Controller 130 may be configured to receive such touch or gesture from dynamic marine display 220/user interface 120 and render display view 312 via primary display 222, which may include shutdown graphic or animation 323 (e.g., a status screen or other shutdown information) corresponding to a shutdown state of user interface 120 and/or mobile structure 101. Upon shutdown completion, controller 130 may be configured to render secondary/shutdown display view 303 including power selector icon 324 displaced towards the center of secondary display 224 (e.g., and without slide animation 325).

Figure 4:
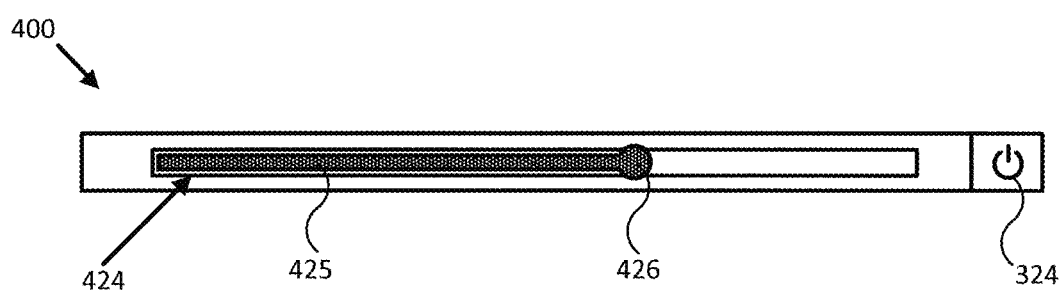
FIG. 4 illustrates a display view and/or animation rendered by a user interface for a dynamic marine display system in accordance with an embodiment of the disclosure.

FIG. 4 illustrates a display view and/or animation 400 rendered by user interface 120 for dynamic marine display system 100 in accordance with an embodiment of the disclosure. For example, FIG. 4 shows interactive/slider control display view 400 including display parameter slider control 424, display parameter slider control level indicator 425, and display parameter slider control selector 426 rendered via secondary display 224. In some embodiments, controller 130 may be configured to receive user selection comprising a touch along display parameter slider control 424 or a swipe gesture initiated at display parameter slider control selector 426, as rendered by secondary display 224, where the user selection is configured to modify a display parameter (e.g., contrast, brightness, gamma, saturation, span) associated with primary and/or secondary displays 222 and/or 224. After receiving such user selection, controller 130 may be configured to render display parameter slider control 424 modified according to the received user selection (e.g., with a different length display parameter slider control level indicator 425) via secondary display 224.

Figure 5:
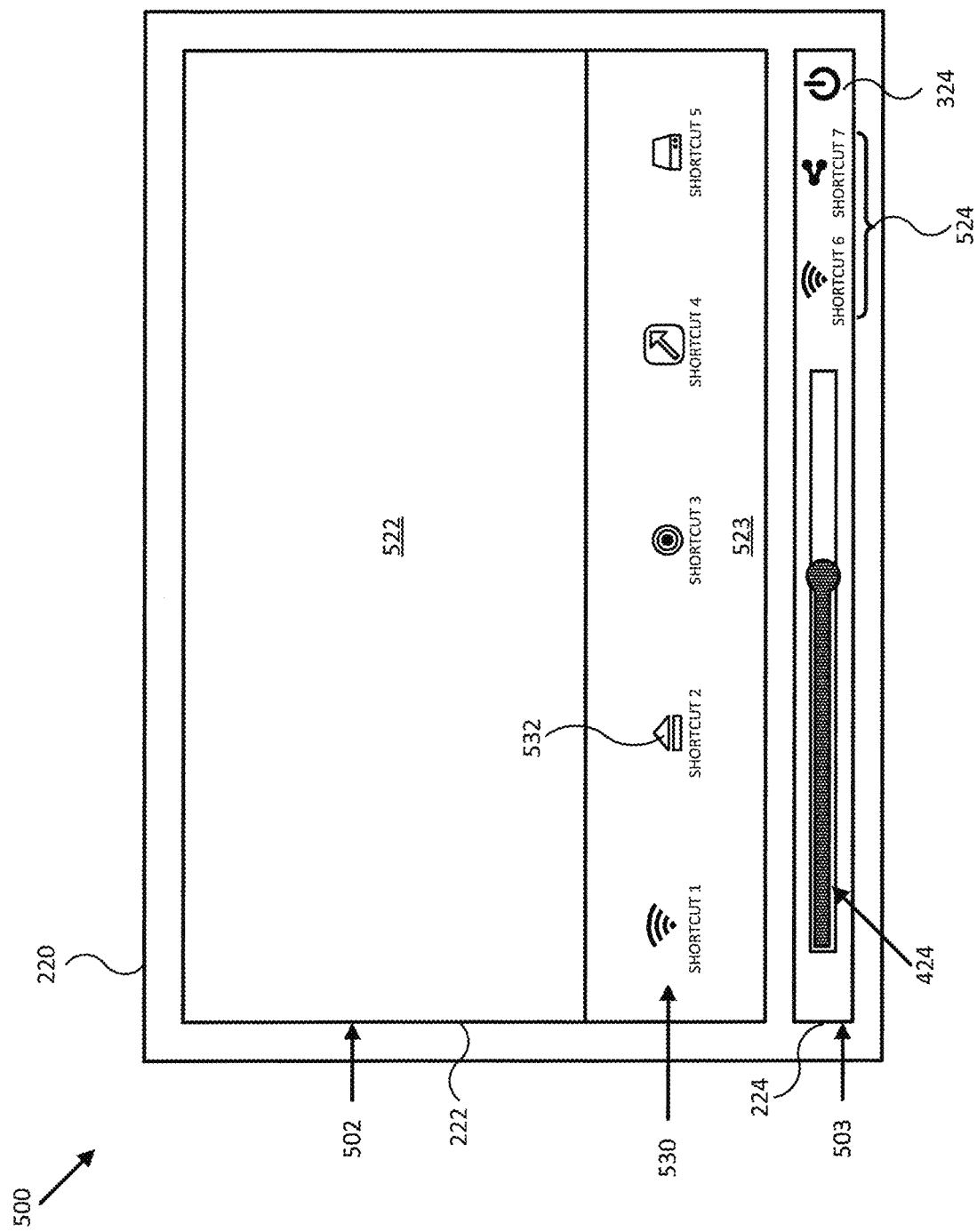
FIG. 5 illustrates a display view and/or animation rendered by a user interface for a dynamic marine display system in accordance with an embodiment of the disclosure.

FIG. 5 illustrates a display view and/or animation rendered user interface 120 for dynamic marine display system 100 in accordance with an embodiment of the disclosure. For example, FIG. 5 shows interactive display view 500 with primary display view 502 including operational display view 522 (e.g., any of the operational display views described herein) overlaid by shortcut list menu 523, all rendered via primary display 222. Interactive display view

500 may also include secondary/system shortcut display view 503, which may include an embodiment of slider control 424, shortcut selection menu 524, and/or power selector icon 324. In various embodiments, shortcut selection menu 524 provides immediate access to various controls and/or functions of user interface 120, and shortcut list menu 523 allows a user to customize shortcut selection menu 524 and/or access a larger selection of shortcut selector icons. In some embodiments, controller 130 may be configured to receive user selection comprising a touch on one of shortcut selector icons 532 within shortcut selector menu 524 rendered by secondary display 224. As shown in FIG. 5, such selection of shortcut selector icons 532 may include one or more of a screenshot capture icon, a memory card eject icon, a wireless networking configuration icon, a waypoint marker icon, a potential threat icon, a sonar system controller icon, and/or another operational mode icon associated with an operational mode of user interface 120 and/or mobile structure 101, as described herein. After receiving such user selection, controller 130 may be configured to render an operational display view (e.g., operational display view 522) corresponding to the selected one of shortcut selector icons 532 and/or shortcut list menu 523 associated with user interface 120 and/or mobile structure 101, which may include shortcut list 530 of shortcut selector icons 532, as shown. Controller 130 may also be configured to render slider control 424, shortcut selector menu 524 including the selection of shortcut selector icons 532, and/or power selector icon 324 of secondary display view 503.

Figure 6:
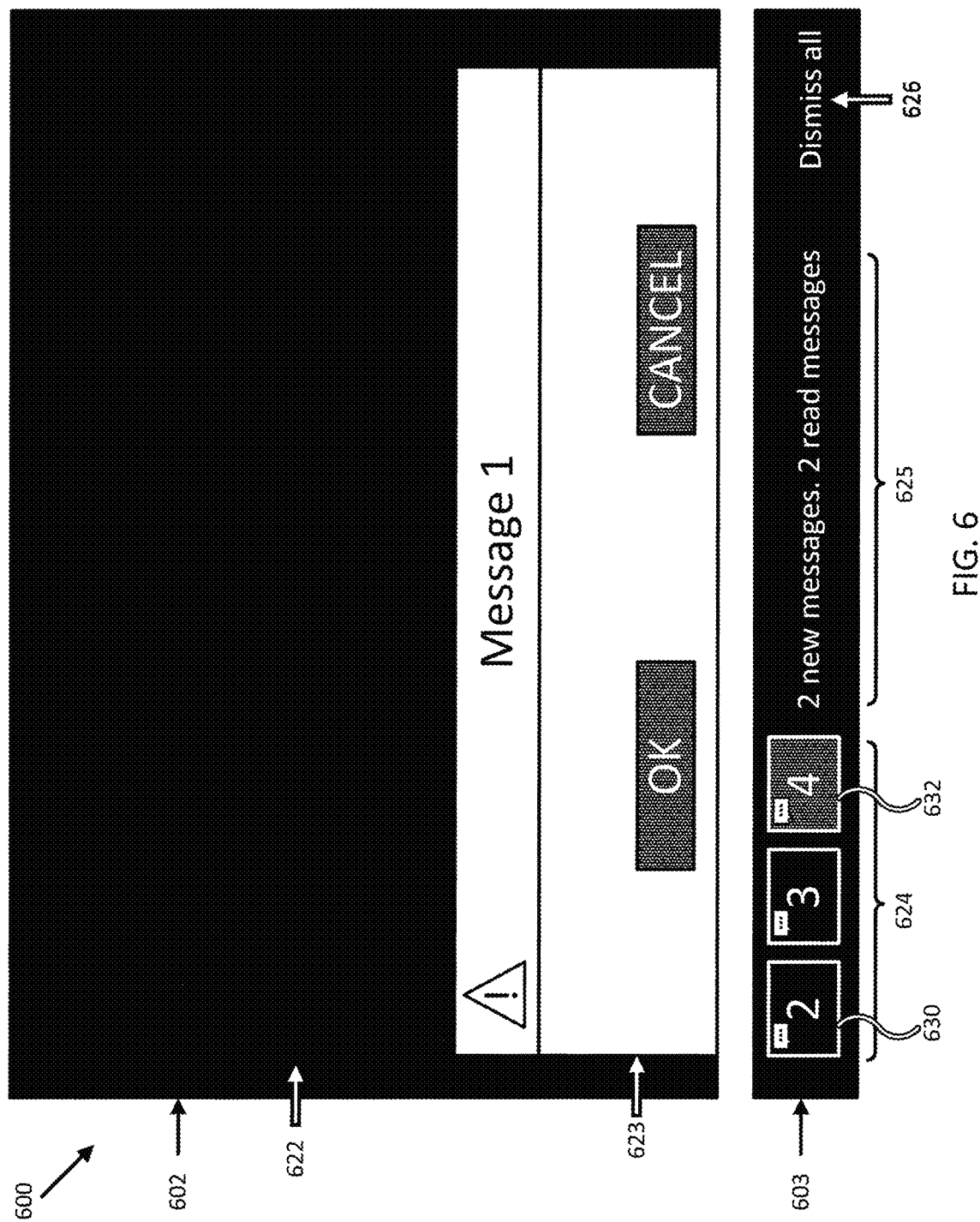
FIG. 6 illustrates a display view and/or animation rendered by a user interface for a dynamic marine display system in accordance with an embodiment of the disclosure.

FIG. 6 illustrates a display view and/or animation rendered by user interface 120 for dynamic marine display system 100 in accordance with an embodiment of the disclosure. For example, FIG. 6 shows interactive display view 600 with primary display view 602 including operational display view 622 (e.g., any of the operational display views described herein) overlaid by system message window 623, all rendered via primary display 222. Interactive display view 600 may also include secondary/system message management display view 603, which may include message list menu 624 with one or more message selector icons 630, 632, message list status indicator 625, and/or message list control selector 626. In various embodiments, system message management display view 603 provides simplified system message management for user interface 120/system 100; message list menu 624 provides immediate access to system messages corresponding to message selector icons 630, 632, message selector icons 630, 632 indicate a read or receipt order of system messages, message list status indicator 625 provides a condensed summary of system messages, and message list control selector 626 allows a user to control an entire message list at once (e.g., dismiss all messages).

In some embodiments, controller 130 may be configured to receive user selection comprising a touch on one of message selector icons 630, 632 within message list menu 624 rendered by secondary display 224. As shown in FIG. 6, such message selector icons 630, 632 may include a graphic (e.g., the system message corresponding to black/high contrast message selector icon 630 is unread, the system message corresponding to grey/low contrast message selector icon 632 is read and/or being displayed) and/or graphics characteristic configured to indicate a read and/or a receipt order status of the message selector icon. After receiving such user selection, controller 130 may be configured to render system message window 623 corresponding to the selected one of the message selector icons, which may include message text and/or a message graphic corresponding to a system status or alert associated with user interface 120 and/or mobile structure 101. Controller 130 may also be configured to render message list menu 624, message list status indicator 625, and/or message list control selector 626 within secondary display view 603.

Figure 7A:
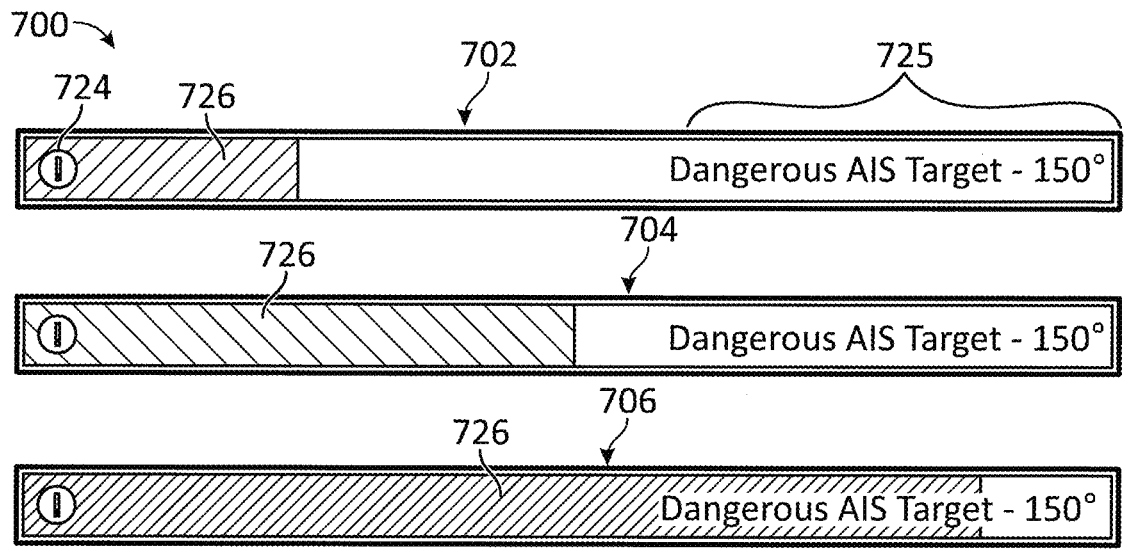
FIGS. 7A-B illustrate display views and/or animations rendered by a user interface for a dynamic marine display system in accordance with an embodiment of the disclosure.
Figure 7B:
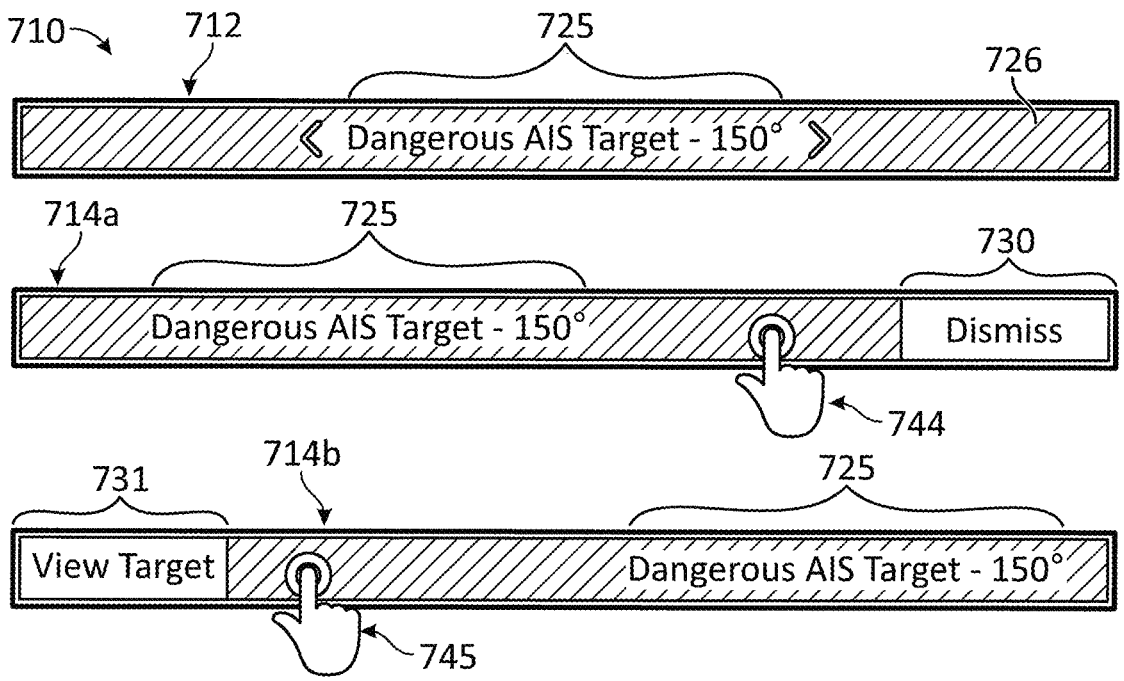

FIGS. 7A-B illustrate display views and/or animations rendered by user interface 120 for dynamic marine display system 100 in accordance with an embodiment of the disclosure. For example, FIG. 7A shows interactive and/or informational animation/display views 700 with secondary/system alert display views 702, 704, 706, which may include alert status icon 724, alert severity bar 726, and/or alert context indicator 725. In various embodiments, alert status icon 724 indicates an alert, alert severity bar 726 provides an easily recognizable, dynamic, and repeatable sense of the severity of the alert, and alert context indicator 725 provides the system context of the alert, such as which subsystem is initiating the alert, why, and where the pilots focus should be in a crisis. As shown in FIG. 7B, interactive animation/display views 710 include secondary/system alert display views 712, 714a, 714b, which may also include alert severity bar 726 and/or alert context indicator 725 and may additionally include alert dismissal indicator 730 or alert engagement indicator 731. In various embodiments, alert dismissal indicator 730 indicates that a user has selected to dismiss the alert, and alert engagement indicator 731 indicated that a user has selected to engage the alert, which may include rendering a particular operational display view in primary display 222 (e.g., a radar or sonar or autopilot operational display view, for example).

In some embodiments, controller 130 may be configured to receive user selection comprising a dismiss alert or an engage alert swipe gesture initiated within or adjacent to alert severity bar 726 and/or alert context indicator 725 rendered by secondary display 224, where alert severity bar 726 may include a color, length, and/or graphics characteristic configured to indicate a severity of a system alert associated with user interface 120 and/or mobile structure 101, and where alert context indicator 725 may include text indicating the context of the system alert, as shown. After receiving such user selection, controller 130 may be configured to render alert context indicator 725 and one of alert dismissal indicator 730 or alert engagement indicator 731 corresponding to the received user selection within secondary display view 714a or 714b.

Figure 8:
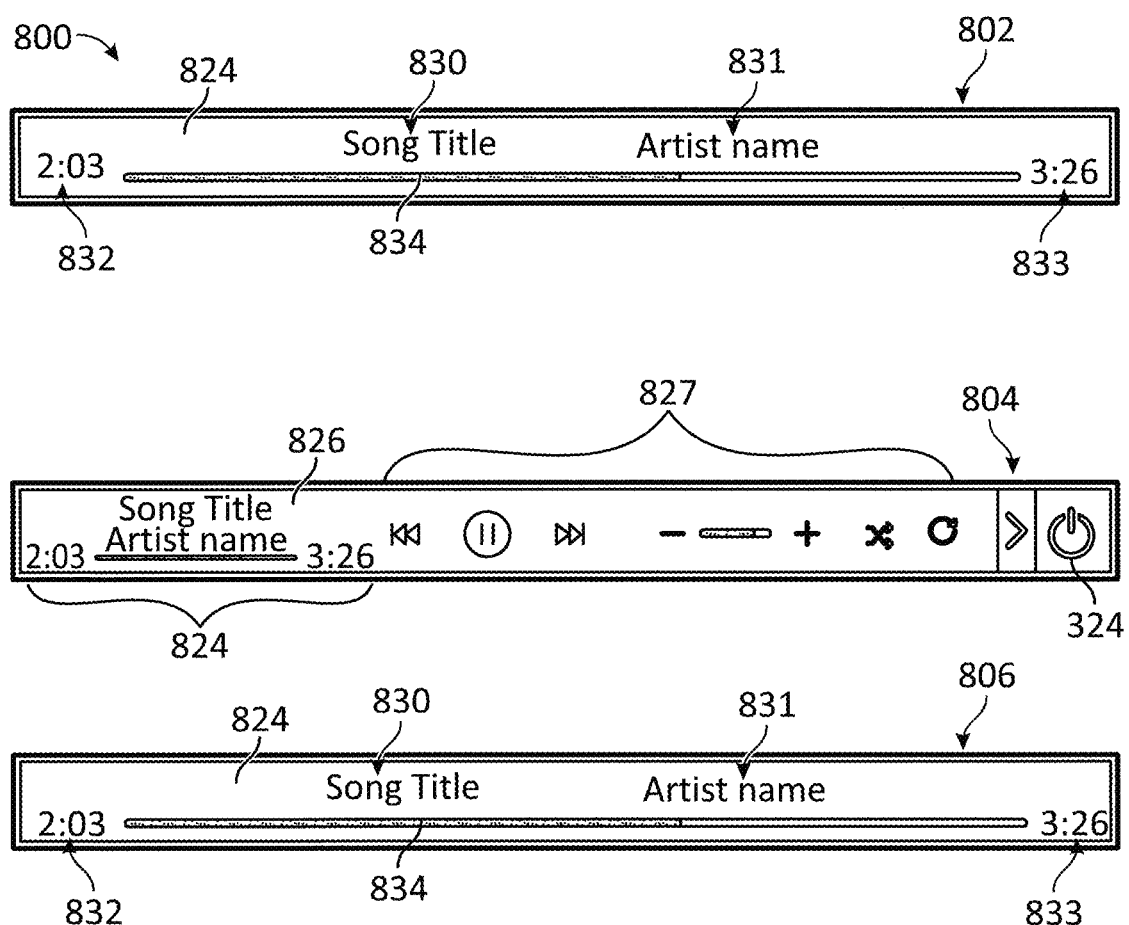
FIG. 8 illustrates display views and/or animations rendered by a user interface for a dynamic marine display system in accordance with an embodiment of the disclosure.

FIG. 8 illustrates display views and/or animations rendered by user interface 120 for dynamic marine display system 100 in accordance with an embodiment of the disclosure. For example, FIG. 8 shows interactive and/or informational animation/display views 800 with secondary/informational display views 802 and 806, which may include media player information display view 824 with various media identifiers 830, 831, media playback time 832, media duration time 833, and/or media progress bar 834, for example, and with secondary/interactive display view 804, which may include an embodiment of media player information display view 824 along with various media control selectors 827 and/or power selector icon 324. In general, secondary display views 802-806 may swap between informational display views and interactive display views based on a detected proximity of a user. For example, some display view configurations can have two modes:

information view and interactive view. A display transitions from information view to interactive view when the user indicates that they wish to interact with the controls. This can be via a proximity sensor detecting an approaching finger, or some other method. The display can transition from interactive view to information view when the user no longer wishes to interact with the controls (e.g., by the proximity sensor detecting the fingers have moved away from the screen, or via a timeout etc.).

In some embodiments, controller 130 may be configured to receive user selection including a proximity gesture associated with informational display view 802 rendered by secondary display 224, where informational display view 802 includes media player informational display view 824, a sonar system informational display view, a radar system informational display view, a route informational display view, an autopilot informational display view, and/or another informational display view configured to indicate a respective media player status, sonar system status, route status, autopilot status, or other system status, as described herein. After receiving such user selection, controller 130 may be configured to render interactive display view 804 corresponding to informational display view 802 rendered by secondary display 224. Controller 130 may also be configured to detect absence of the proximity gesture for a predetermined period of time and render an updated secondary display view 800 via secondary display 224 including informational display view 806.

Figure 9A:
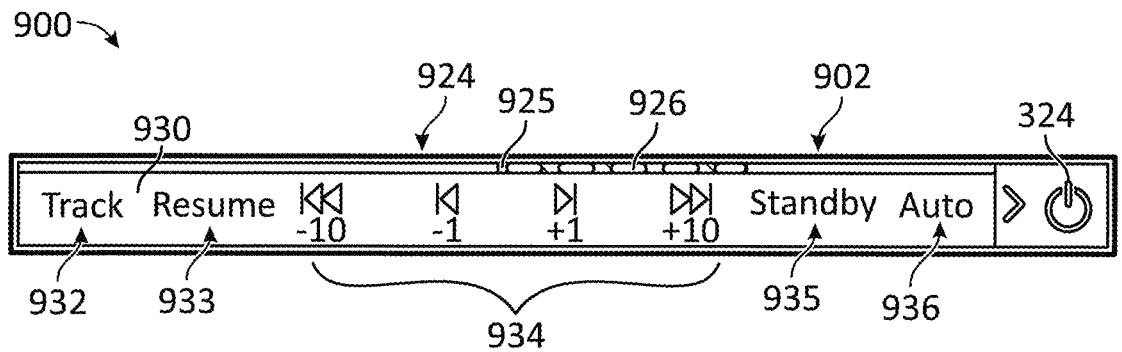
FIGS. 9A-B illustrate display views and/or animations rendered by a user interface for a dynamic marine display system in accordance with an embodiment of the disclosure.
Figure 9A:
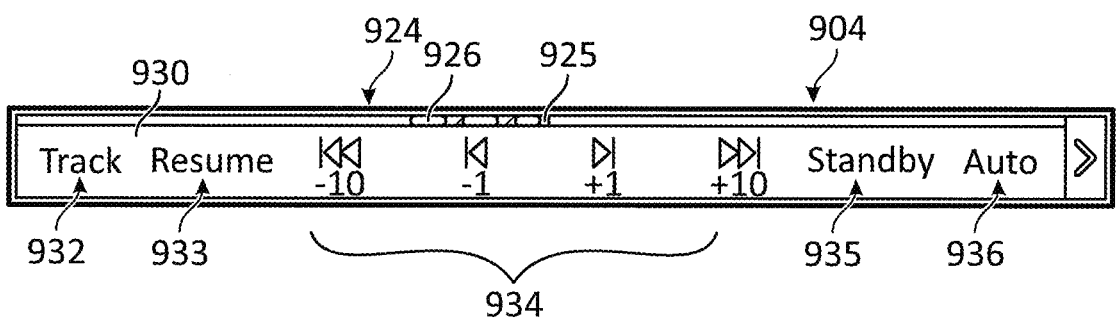
Figure 9B:
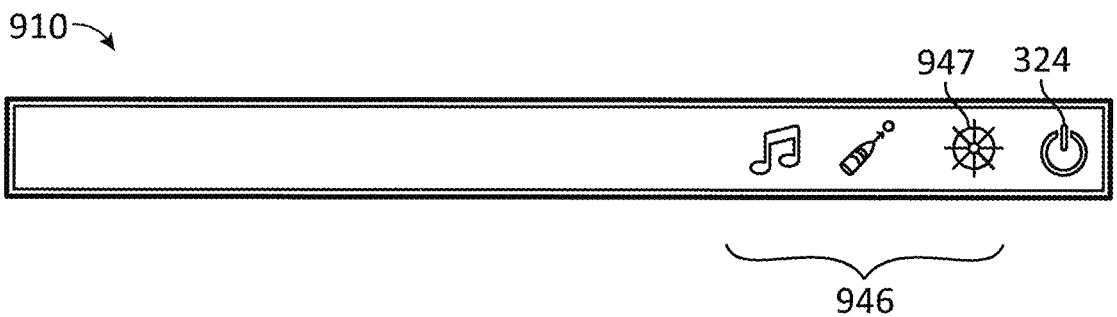

FIGS. 9A-B illustrate display views and/or animations rendered user interface 120 for dynamic marine display system 100 in accordance with an embodiment of the disclosure. For example, FIG. 9A shows interactive animation/display views 900 with secondary/autopilot display views 902 and 904, which may include rudder position indicator bar 924 and autopilot interactive display view 930 with various autopilot mode and steering control selectors 932-936. In general, secondary display views 802-806 may swap between informational display views and interactive display views based on a detected proximity of a user. In FIG. 9A, rudder position indicator bar 924 includes center rudder indicator 925 and rudder position indicator 926, which may present a steering angle or steering demand provided by steering sensor/actuator 150.

In some embodiments, controller 130 may be configured to receive user selection including a touch on one of autopilot mode and/or steering control selectors 932-936 within autopilot interactive display view 930 rendered by secondary display 224, where each autopilot mode selector (e.g., track mode selector 932—mobile structure 101 maintains a selected track or heading, resume mode selector 934—mobile structure 101 reenters a last-exited autopilot mode, standby mode selector 935—mobile structure 101 pauses or releases the autopilot mechanical control but continues to determine autopilot control signals, full autopilot mode selector 936—mobile structure enters full autopilot mode to follow a route and/or evade navigational hazards, etc.) is configured to enable or disable an operational mode of an autopilot integrated with user interface 120 and/or mobile structure 101, and where each steering control selector 934 is configured to adjust a rudder demand associated with mobile structure 101, such as via control signals provided to steering sensor/actuator 150, as described herein. After receiving such user selection, controller 130 may be configured to render secondary display view 904, including autopilot mode selectors and/or steering control selectors 932-936 and rudder position indicator bar 924 configured to indicate a steering angle of rudder for mobile structure 101 and/or the rudder demand associated with mobile structure 101.

FIG. 9B shows interactive animation/operational mode selector display view 910, which may include operational mode selector menu 946 with various operational mode selectors 947 and/or power selector icon 324. In general, operational mode selectors 947 allow a user to jump to a particular operation mode display view for primary display 222.

In some embodiments, controller 130 may be configured to receive user selection including a touch on one of operational mode selectors 947 within operational mode selector menu 946 rendered by secondary display 224, where each operational mode selector 947 corresponds to an interactive display view renderable by secondary display 224, and where the interactive display view is one of a media player interactive display view, a sonar system interactive display view, a radar system interactive display view, a route interactive display view, an autopilot interactive display view comprising one or more selectors, and/or other interactive display view, as described herein. After receiving such user selection, controller 130 may be configured to render an interactive display view corresponding to the selected operational mode. Controller 130 may also be configured to detect absence of the proximity gesture for a predetermined period of time and render an updated secondary display view 800 via secondary display 224 including informational display view 806.

Figure 10:
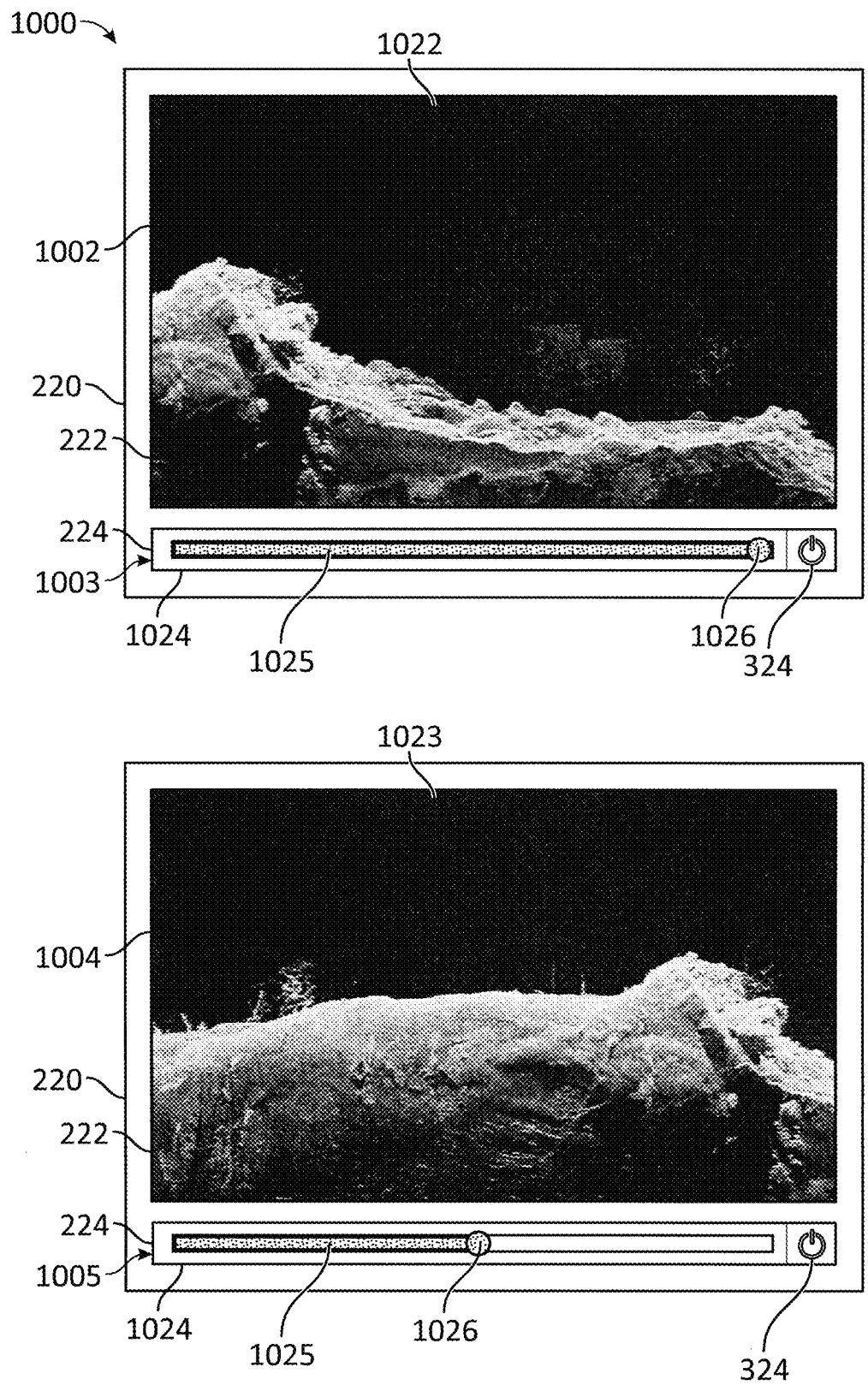
FIG. 10 illustrates display views and/or animations rendered by a user interface for a dynamic marine display system in accordance with an embodiment of the disclosure.

FIG. 10 illustrates display views and/or animations rendered by user interface 120 for dynamic marine display system 100 in accordance with an embodiment of the disclosure. For example, FIG. 10 shows interactive animation/display views 1000 with primary/sonar data history display views 1002 and 1004 and secondary/sonar data history display views 1003 and 1005. Primary/sonar data history display views 1002 and 1004 may include sonar history data sets 1022 and 1023, and secondary/sonar data history display views 1003 and 1005 may include sonar history slider control 1024 with sonar history slider control buffer indicator 1025 and sonar history slider control selector 1026. In general, sonar history slider control 1024 may be used to view/rewind sonar data as presented in the past, up to the amount of sonar data contained within a sonar data buffer for system 100.

In some embodiments, controller 130 may be configured to receive sonar data from sonar transducer assembly 112 and render sonar image data corresponding to the received sonar data via primary display 222. Controller 130 may receive user selection including a touch along sonar data history slider control 1024 or a swipe gesture initiated at sonar data history slider control selector 1026, rendered by secondary display 224 and configured to modify a sonar history display time associated with the received sonar data. After receiving such user selection, controller 130 may be configured to render sonar history display view 1023 via primary display 222 based, at least in part, on the sonar data received from sonar transducer assembly 112 and the received user selection, and to render sonar history data slider control 1024 modified according to the received user selection, as described herein.

Figure 11A:
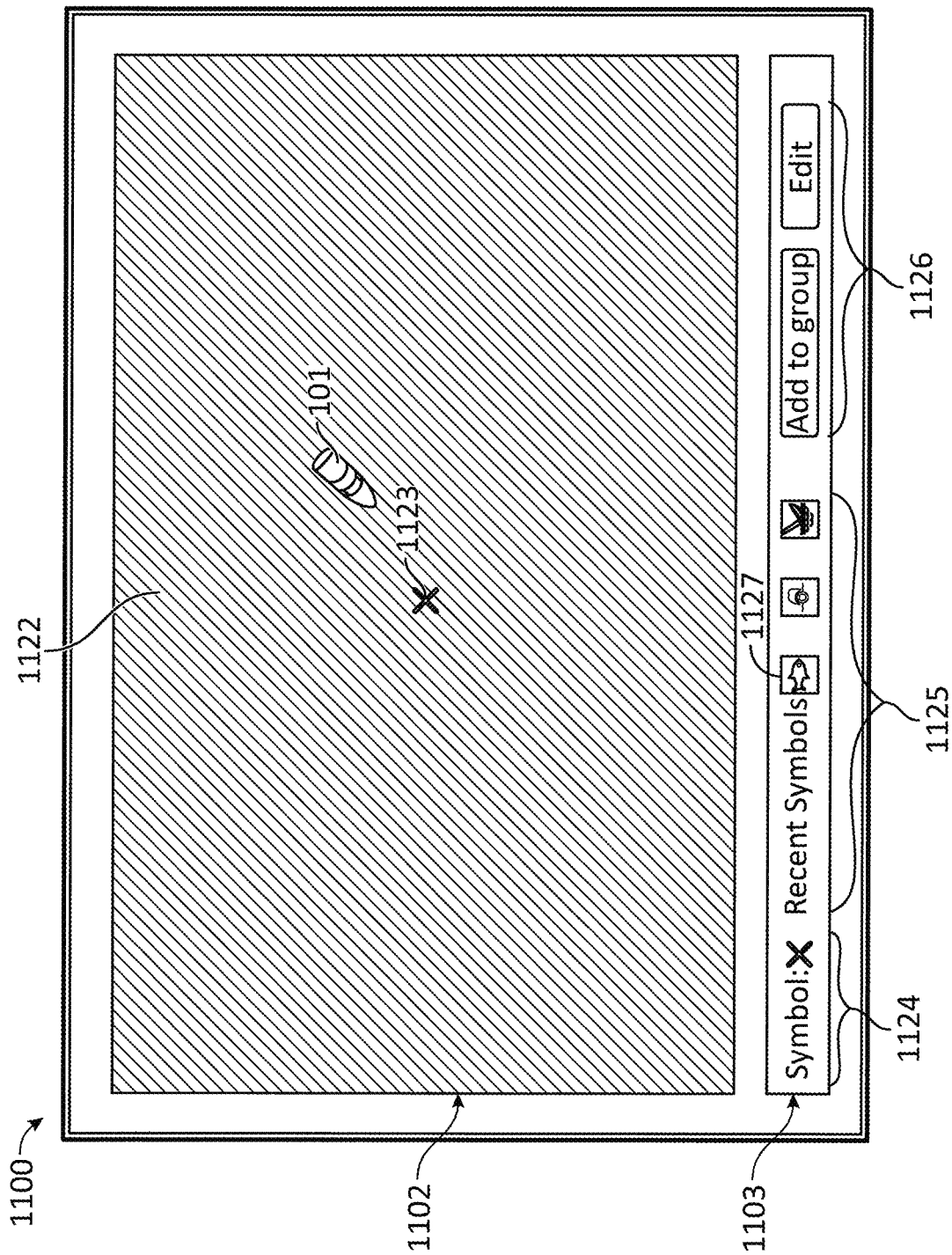
FIGS. 11A-B illustrate display views and/or animations rendered by a user interface for a dynamic marine display system in accordance with an embodiment of the disclosure.
Figure 11B:
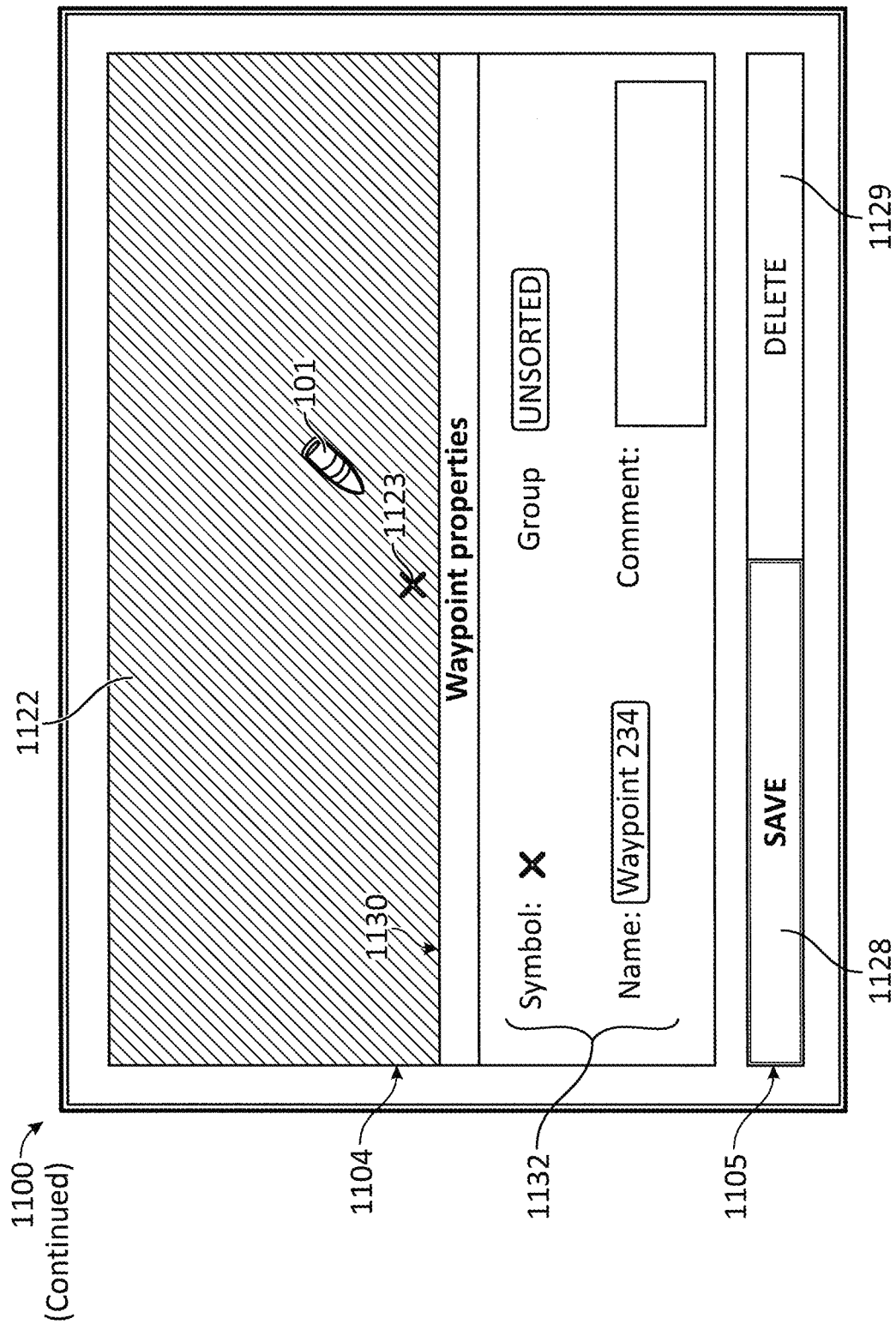

FIGS. 11A-B illustrate display views and/or animations rendered by user interface 120 for dynamic marine display system 100 in accordance with an embodiment of the disclosure. For example, FIGS. 11A-B show interactive animation/display views 1100 with primary/interactive waypoint editor display views 1102 and 1104 and secondary/interactive waypoint editor display views 1103 and 1105. Primary/waypoint editor display views 1102 and 1104 may include chart data 1122 including mobile structure icon 101 and waypoint selector icon 1123, and secondary/waypoint editor display views 1103 and 1105 may include waypoint status indicator 1124, waypoint icon selection menu 1125, and waypoint action selectors 1126. In general, waypoint editor display views 1102-1105 allow a user to edit waypoint characteristics without cluttering the primary display view. For example, when a user first creates a waypoint in the charting or routing application, they have an opportunity to edit the waypoint properties if they wish. However, many users ignore this option and continue to use the device. In these instances, it is beneficial to house the editing options in secondary display 224 so that they do not impinge on the main Chart application area in primary display 222. Hence the user feels no pressure to dismiss the message in order to reveal the content below. An edit button within the secondary display view allow the user to make more detailed edits, in which case the main and sub-displays can combine to provide an editing user interface, as shown.

In some embodiments, controller 130 may be configured to receive user selection including a touch on one of one or more waypoint icons 1127 within waypoint icon selection menu 1125 or on waypoint action selector 1126 rendered by secondary display 224, where each waypoint icon 1127 comprises a graphic configured to indicate a waypoint type associated with the waypoint icon. After receiving such user selection, controller 130 may be configured to render mobile structure icon 101, waypoint selector icon 1123, and/or waypoint edit menu 1130 via primary display 222, where waypoint edit menu 1130 includes waypoint detail editing selectors 1132 each configured to modify at least one waypoint characteristic of waypoint selector icon 1123. Controller 130 may also be configured to render waypoint editing control selectors 1128 and/or 1129 via secondary display 224, where waypoint editing control selectors 1128 and/or 1129 are configured to save or discard modifications to the waypoint characteristics.

Figure 12A:
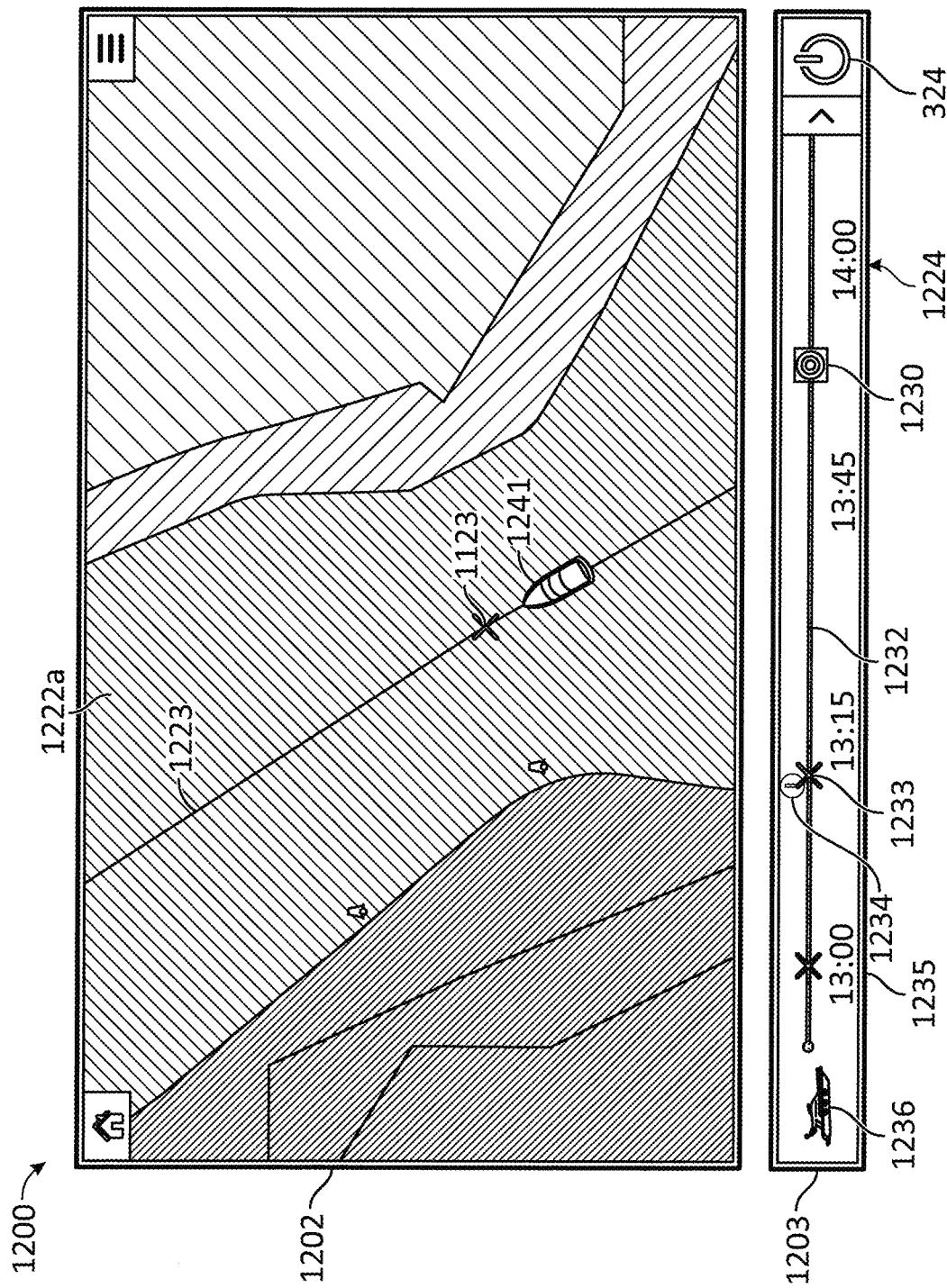
FIGS. 12A-C illustrate display views and/or animations rendered by a user interface for a dynamic marine display system in accordance with an embodiment of the disclosure.
Figure 12B:
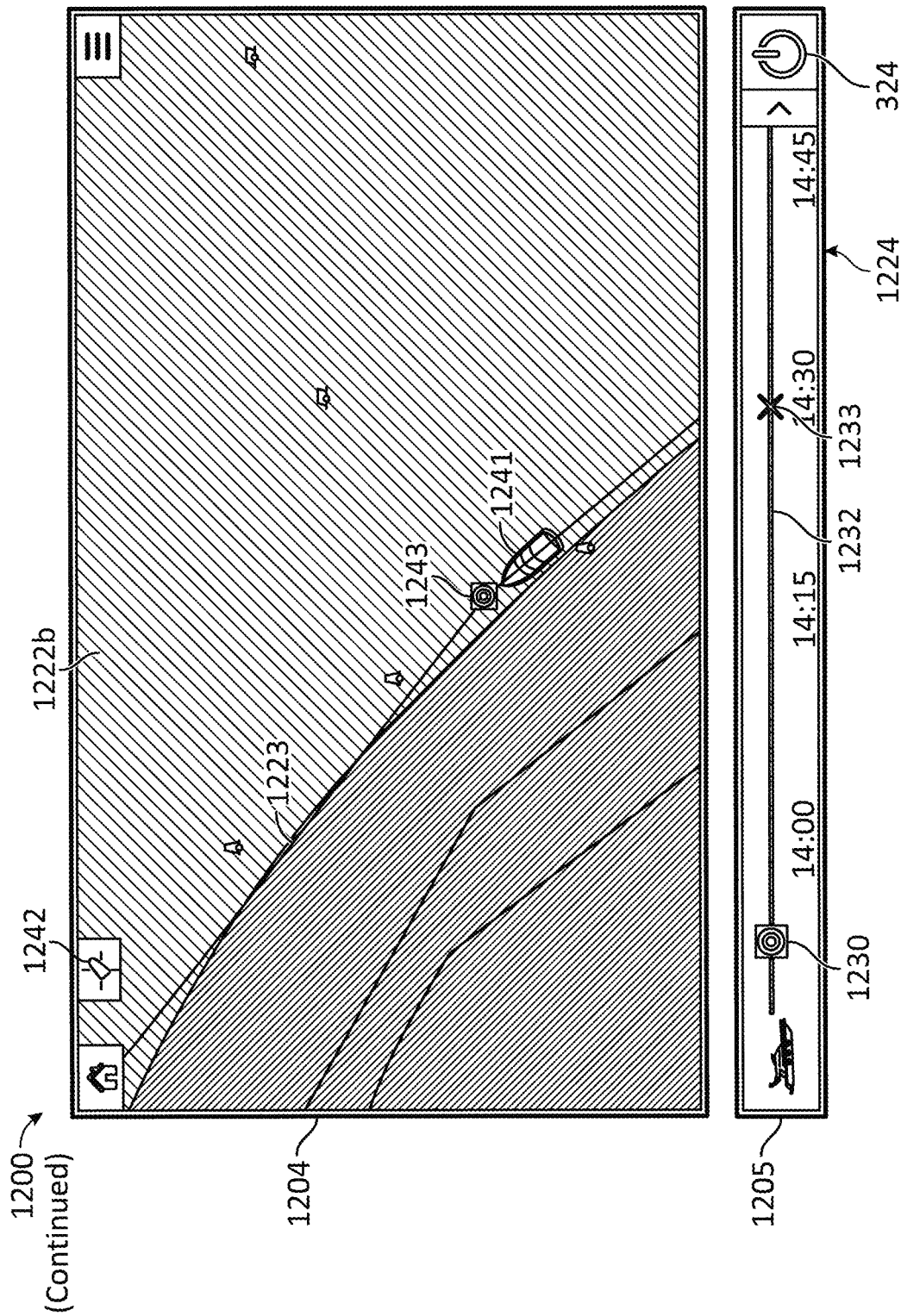
Figure 12C:
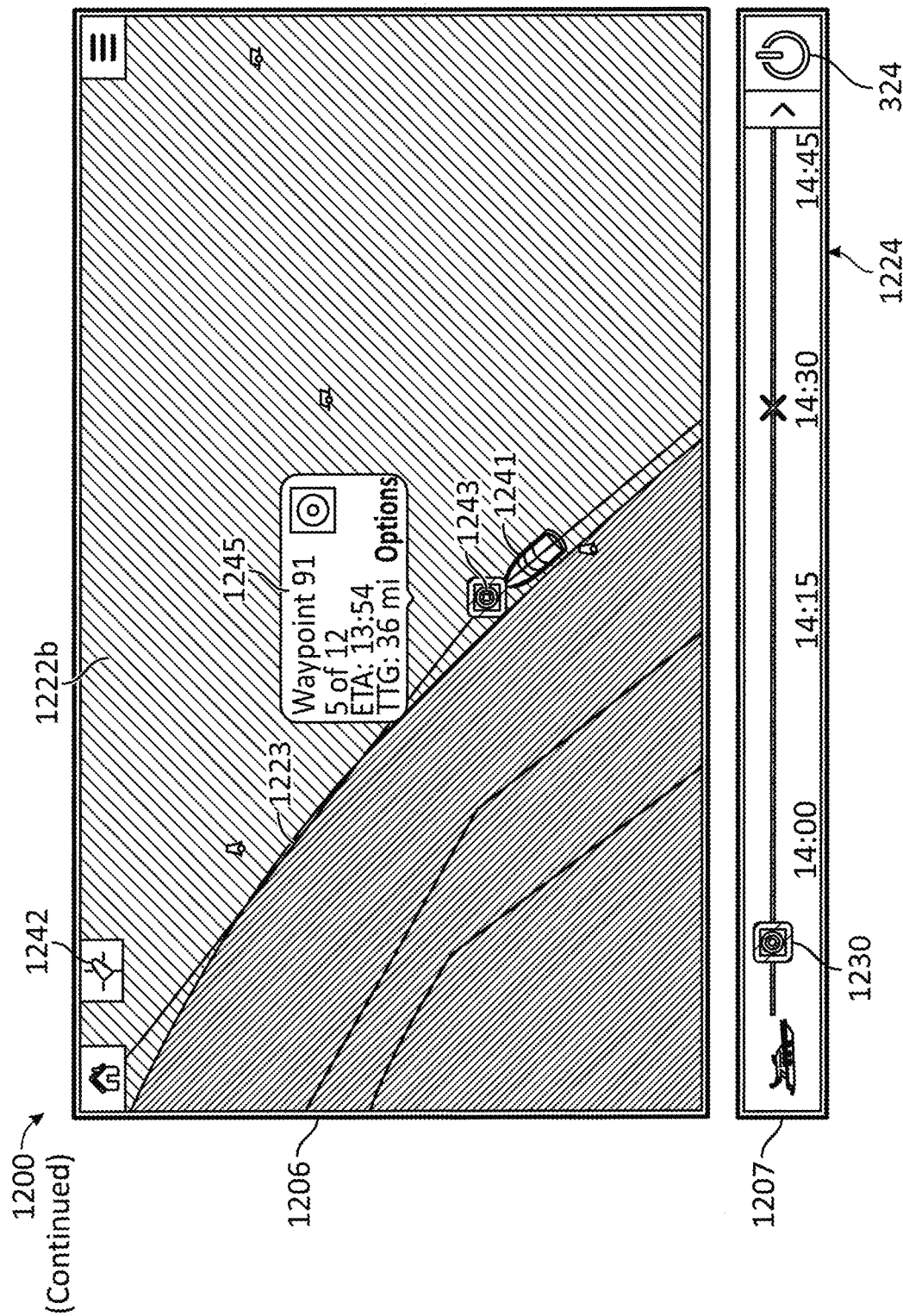

FIGS. 12A-C illustrate display views and/or animations rendered by user interface 120 for dynamic marine display system 100 in accordance with an embodiment of the disclosure. For example, FIGS. 12A-C show interactive animation/display views 1200 with primary/interactive route timeline display views 1202, 1204, 1206 and secondary/interactive route timeline display views 1203, 1205, 1207. Primary/route timeline display views 1202, 1204, 1206 may include chart data 1222a or 1222b including mobile structure position indicator 1241, route marks 1223, waypoint selector icon 1123, and/or route progress indicator/selector 1243, and secondary/route timeline display views 1203, 1205, 1207 may include route timeline slider control 1224. In general, route timeline display views 1202-1207 allow a user to view past and projected route positions for mobile structure 101. For example, when navigating in a charting application, the user can access an interactive timeline on secondary display 224. By dragging the timeline forward and backwards, the user can see the projected progress of the route navigation over time. When scrolling forwards, the user can see a "ghost" boat image that shows the position the vessel will have reached by the projected time. A time scale may be provided on the timeline to indicate the ETA of the waypoints and other markers along the route.

In some embodiments, controller 130 may be configured to receive user selection including a touch along route timeline slider control 1224 or a swipe gesture initiated at a route timeline slider control selector 1230, rendered by the secondary display and configured to modify a route progress time associated with the mobile structure. After receiving such user selection, controller 130 may be configured to render route progress display view 1204/1206 based, at least in part, on the received user selection and/or a position and/or orientation of user interface 120 and/or mobile structure 101, where route progress display view 1204/1206 comprises mobile structure position indicator 1241 comprising a graphics characteristic (e.g., variable transparency) configured to indicate whether the user selection corresponds to a present route progress time, route display progress indicator 1243 configured to indicate a position of mobile structure 101 corresponding the user selection, and/or route progress detail window 1245 configured to indicate timing characteristics (e.g., estimated time of arrival, past actual time of arrival) of the route display progress indicator. Controller 130 may also be configured to render route timeline slider control 1224 via secondary display 224, where route timeline slider control 1224 is modified according to the received user selection. In various embodiments, route timeline slider control 1224 may include vehicle indicator 1236, route time scale indicator 1235, timeline alert indicator 1234, timeline waypoint indicator 1233, and/or route timeline sider control selector 1230, all disposed along route timeline 1232.

Figure 13:
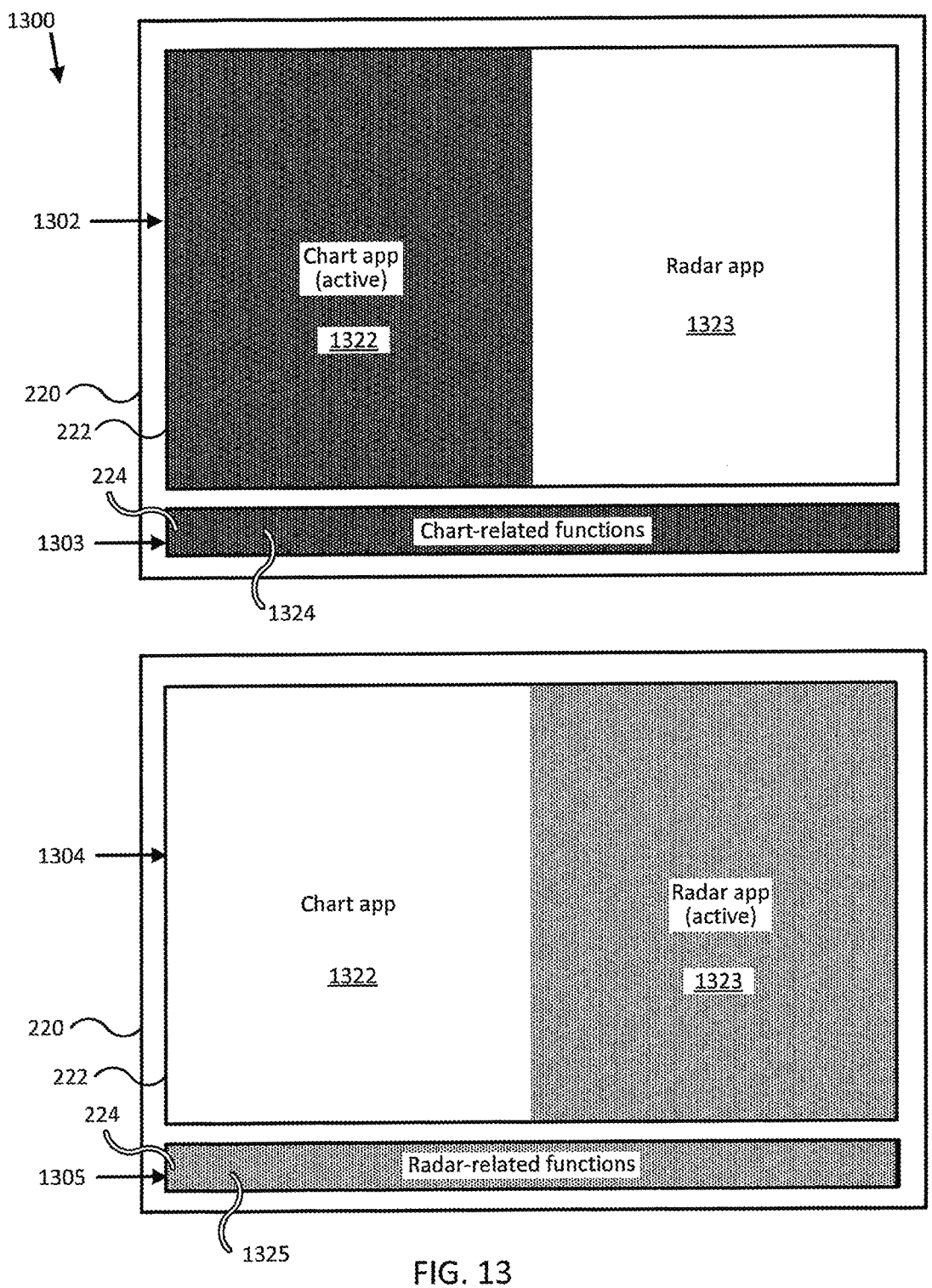
FIG. 13 illustrates display views and/or animations rendered by a user interface for a dynamic marine display system in accordance with an embodiment of the disclosure.

FIG. 13 illustrates display views and/or animations rendered by user interface 120 for dynamic marine display system 100 in accordance with an embodiment of the disclosure. For example, FIG. 13 shows interactive animation/display views 1300 with primary/interactive display views 1302 and 1304 and secondary display views 1303 and 1305. Primary display view 1302 may include initially active display view window 1322 and initially inactive display view window 1323, each corresponding to any one of the operational mode display views described herein. Primary display view 1304 includes the same display view windows but with their active and inactive status swapped. Secondary display view 1303 includes an interactive display view 1324 corresponding to active display view window 1322 of primary display view 1302, and secondary display view 1305 includes interactive display view 1325 corresponding to active display view window 1323 of primary display view 1304. In general, display views 1302-1305 illustrate how controller 130 can render a secondary display view corresponding to an active primary display view window dynamically and automatically upon active switch. For example, some secondary display functions are specific to a particular app, which is displayed on primary display 222. When more than one such application is displayed on the main screen, controller 130 may be configured to update secondary display 224 to reflect the currently active or focused main app.

In some embodiments, primary display view 1302 includes active display view window 1322 and inactive display view window 1323, and secondary display view 1303 includes a first informational or interactive display view 1324 corresponding to active display view window 1322 of primary display view 1302. In such embodiments, controller 130 may be configured to determine activation of inactive display view window 1323 (e.g., by detecting when one display view becomes active programmatically or manually through user selection) and to render, via secondary display 224, second informational or interactive display view 1325 corresponding to the previously inactive display view window of the primary display view (e.g., display view window 1323, in FIG. 13).

Figure 14:
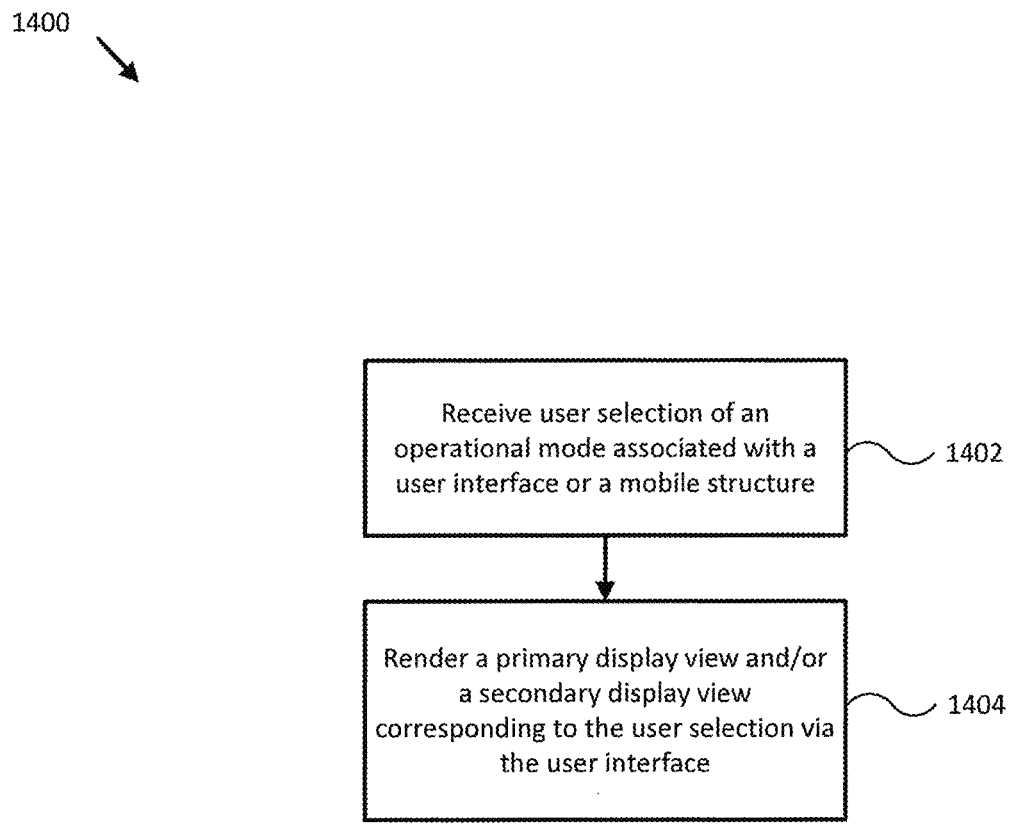
FIG. 14 illustrates a flow diagram of various operations to operate a dynamic marine display system in accordance with an embodiment of the disclosure.

FIG. 14 illustrates a flow diagram of process 1400 to operate dynamic marine display system 100 in accordance with an embodiment of the disclosure. In some embodiments, the operations of FIG. 14 may be implemented as software instructions executed by one or more logic devices associated with corresponding display views, electronic devices, sensors, and/or structures depicted in FIGS. 1A through 13. More generally, the operations of FIG. 14 may be implemented with any combination of software instructions and/or electronic hardware (e.g., inductors, capacitors, amplifiers, actuators, or other analog and/or digital components). It should be appreciated that any step, sub-step, sub-process, or block of process 1400 may be performed in an order or arrangement different from the embodiments illustrated by FIG. 14. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1400 is described with reference to systems described in reference to FIGS. 1A-13, process 1400 may be performed by other systems different from those systems and including a different selection of electronic devices, sensors, assemblies, mobile structures, and/or mobile structure attributes.

Process 500 represents a method for providing display views using system 100, user interface 120, and/or dynamic marine display 220 in accordance with embodiments of the disclosure. At the initiation of process 1400, various system parameters may be populated by prior execution of a process similar to process 1400, for example, or may be initialized to zero and/or one or more values corresponding to typical, stored, and/or learned values derived from past operation of process 1400, as described herein.

In block 1402, a logic device receives user selection of an operational mode associated with user interface 120 and/or mobile structure 101. For example, controller 130 of systems 100 or 100B may be configured to receive user selection of an operational mode associated with user interface 120 and/or mobile structure 101 via one or more user touches and/or gestures applied to secondary display surface 280, as described herein. Such operational mode may be any of the modes and/or display views described herein with respect to FIGS. 3A-13.

In block 1404, a logic device renders a primary display view and/or a secondary display view corresponding to the user selection received in block 1402. For example, controller 130 of may be configured to render any of the primary display views of FIGS. 3A-13 via primary display 222 and/or any of the secondary display views of FIGS. 3A-13 via secondary display 224, each corresponding to the user selection received in block 1402 and/or the operational mode associated with the user interface and/or the mobile structure selected in block 1402.

It is contemplated that any one or combination of methods to provide display views may be performed according to one or more operating contexts of a control loop, for example, such as a startup, learning, running, and/or other type operating context. For example, process 1400 may proceed back to block 1402 and proceed through process 1400 again to produce updated display views, as in a control loop.

Embodiments of the present disclosure can thus provide dynamic marine display views. Such embodiments may be used to provide imagery to assist in navigation for a mobile structure, survey of a body of water, and/or to assist in the operation of other systems, devices, and/or sensors coupled to the mobile structure.

Figure 15A:
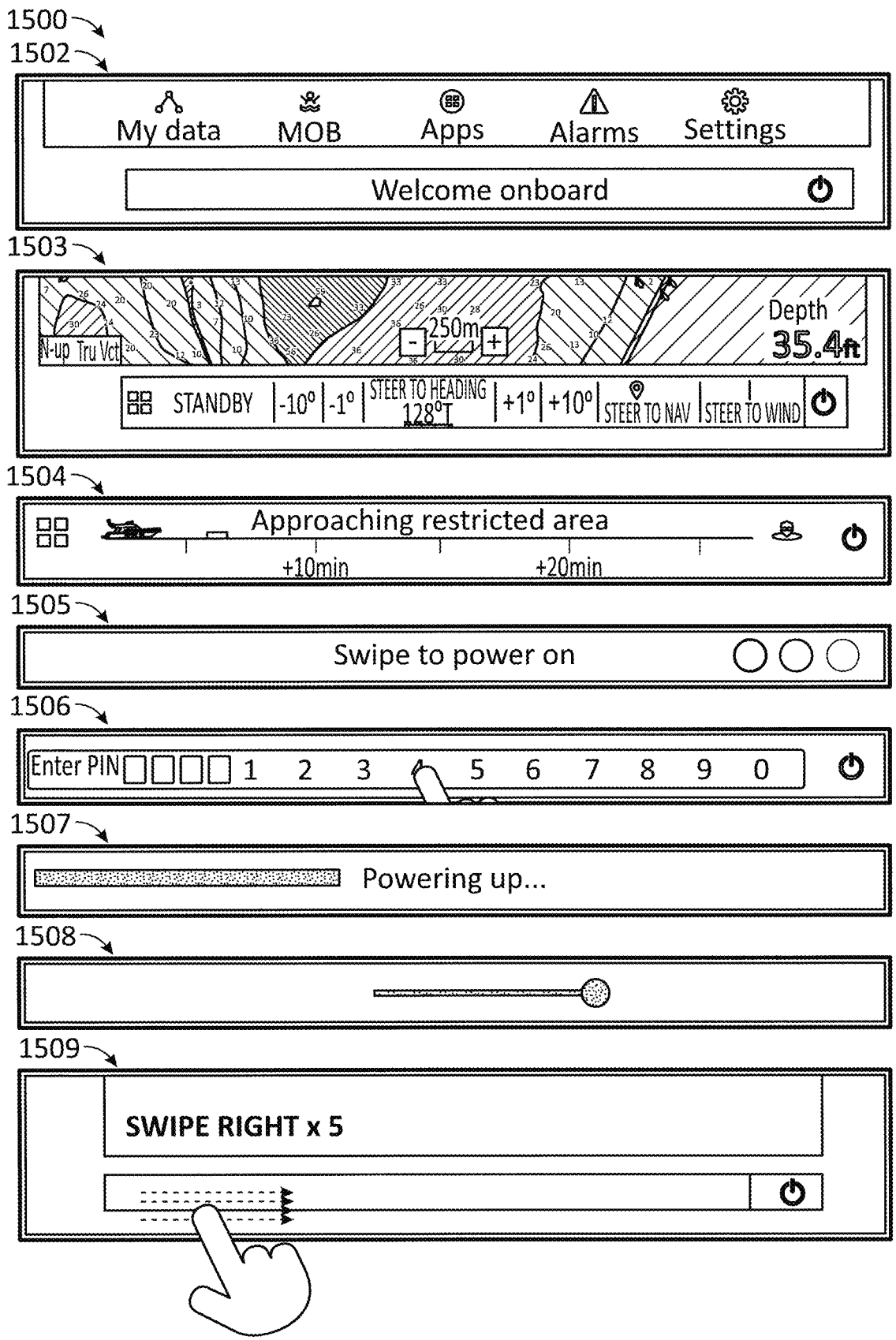
FIGS. 15A-E illustrate display views and/or animations rendered by a user interface for a dynamic marine display system in accordance with an embodiment of the disclosure.

FIGS. 15A-E illustrate additional display views and/or animations rendered by user interface 120 for dynamic marine display system 100 in accordance with an embodiment of the disclosure. For example, FIG. 15A shows interactive animation/display views 1500 with secondary display views 1502-1509. Secondary display view 1502 presents an embodiment of a boot graphic display view including a welcome message and illustrates that secondary display 224 may be shorter in width than primary display 222. Secondary display view 1503 presents an embodiment of an autopilot interactive display view. Secondary display view 1504 presents an embodiment of an informational display view, such as to provide a timeline of potential threats (e.g., which may be part of a route planning or navigational display and/or an autopilot informational display view).

Secondary display view 1505 presents an embodiment of a power on or boot display view. Secondary display view 1506 presents an embodiment of an authentication or PIN unlock display view, which may be used to authenticate a user prior to booting user interface 120, as described herein. Secondary display view 1507 presents an embodiment of a power on or boot animation display view. Secondary display view 1508 presents an embodiment of an interactive/slider control display view, which may be used in a power save operational mode of user interface 120. Secondary display view 1509 presents an embodiment of a service menu access display view, which may be used to access a service menu of user interface 120.

Figure 15B:
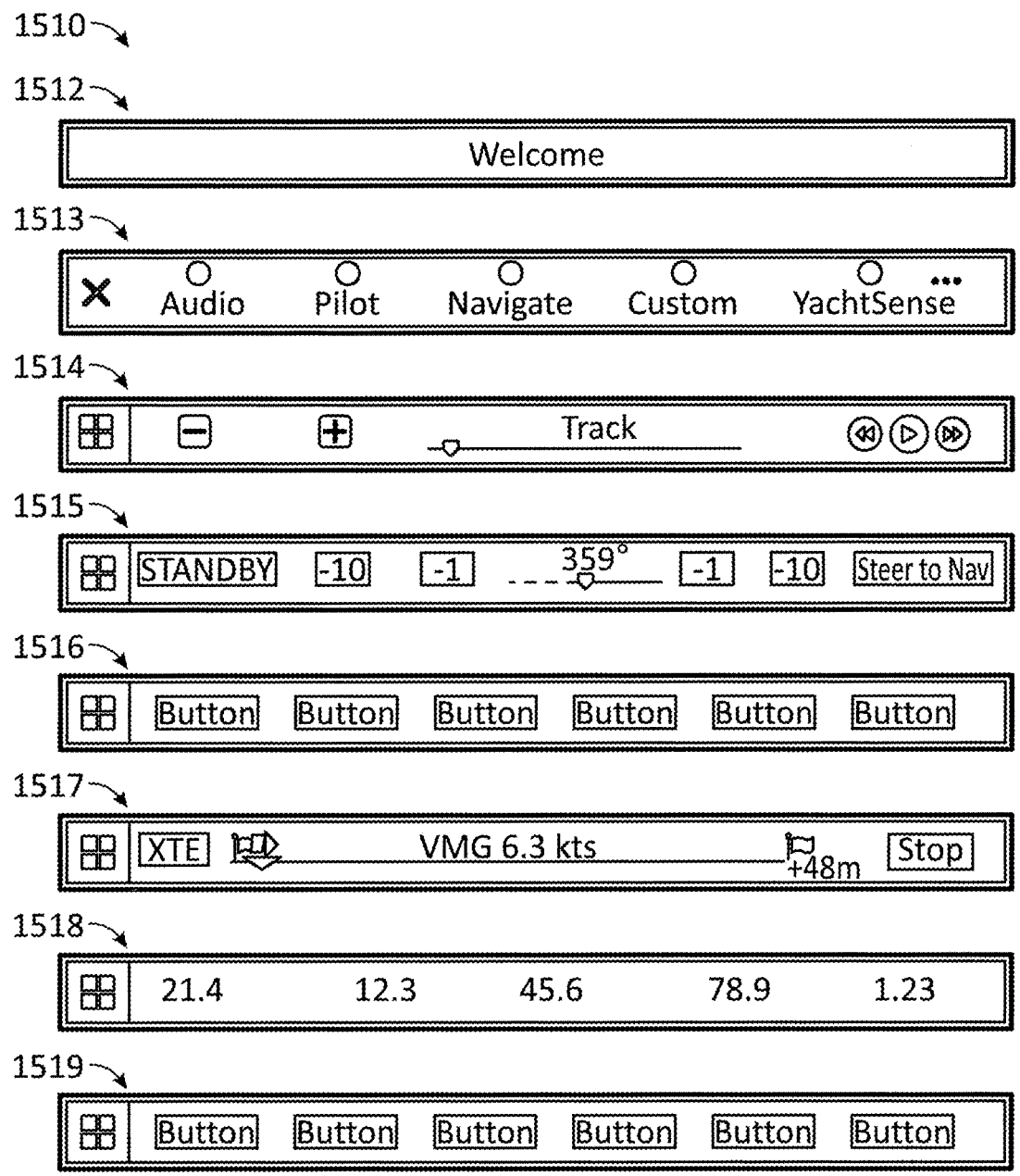

FIG. 15B shows interactive animation/display views 1510 with secondary display views 1512-1519. Secondary display view 1512 presents an embodiment of a boot graphic display view including a welcome message. Secondary display view 1513 presents an embodiment of a shortcut selection menu and/or operational mode selector display view. Secondary display view 1514 presents an embodiment of an interactive media player display view. Secondary display view 1515 presents an embodiment of an autopilot interactive display view. Secondary display view 1516 presents an embodiment of an operational mode selector display view for a specific application. Secondary display view 1517 presents an embodiment of a route navigation interactive display view and/or an autopilot interactive display view. Secondary display view 1518 presents an embodiment of an informational display view. Secondary display view 1519 presents an embodiment of an operational mode selector display view for a specific application.

Figure 15C:
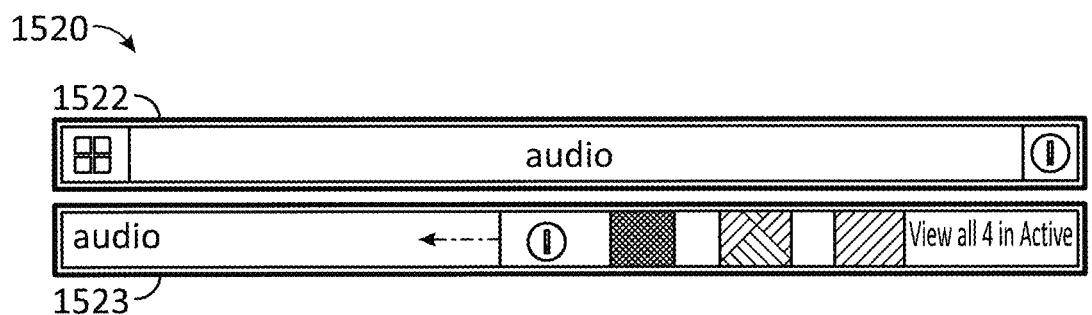
Figure 15D:
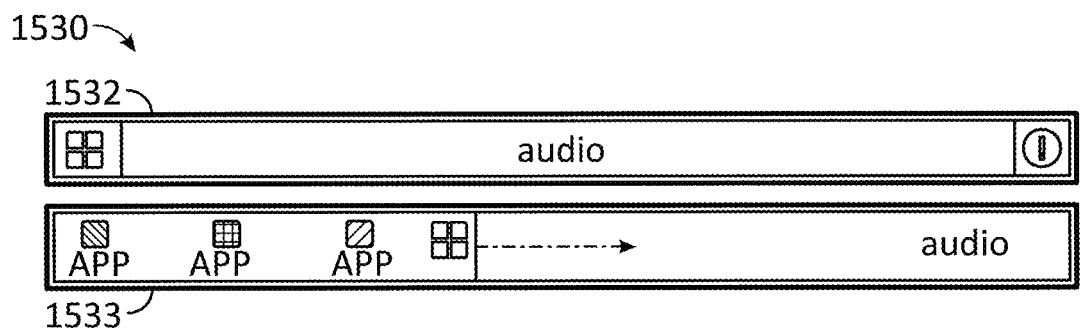
Figure 15E:
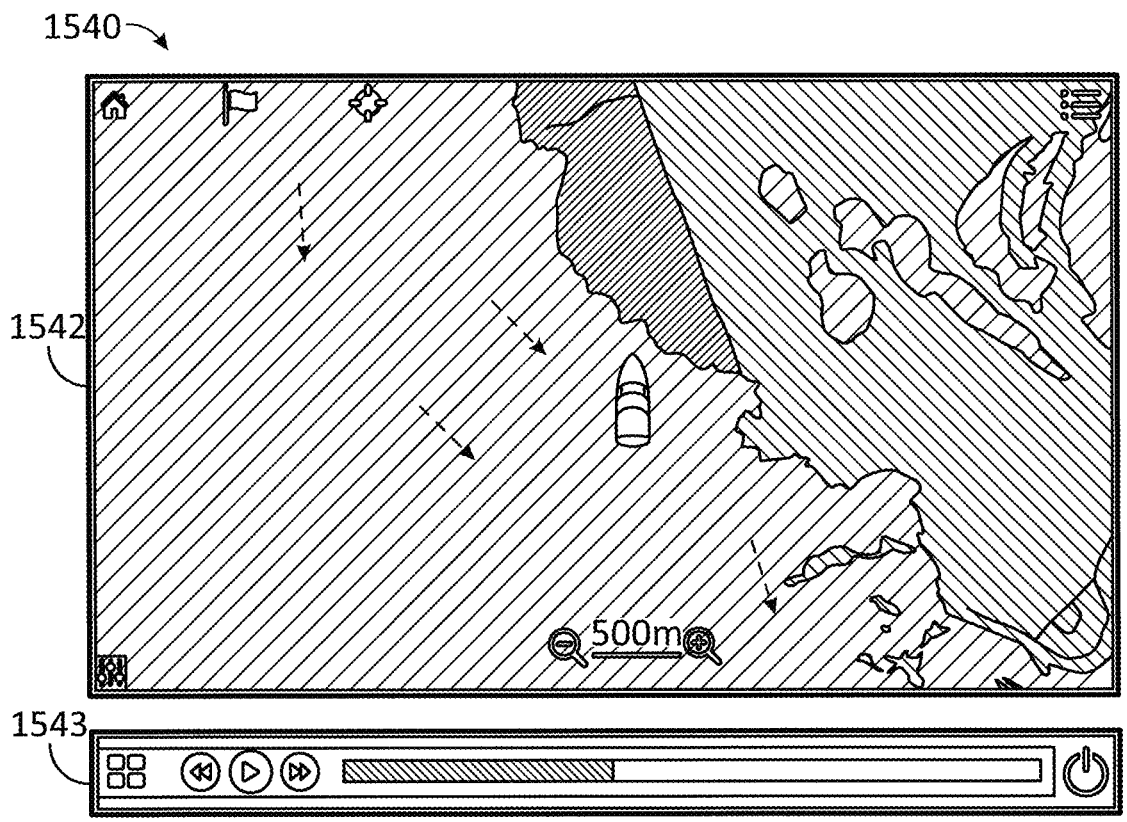

FIG. 15C shows interactive animation/display views 1520 with secondary display views 1522-1523. Secondary display view 1522 presents an embodiment of a media player display view including alert status icon/selector 724 on the right side and a recent selection menu selector on the left side. Secondary display view 1523 presents an embodiment of a media player system alert display view where a user has dragged alert status icon/selector 724 to the left to reveal and/or transition to a system message management display view, as described herein. FIG. 15D shows interactive animation/display views 1530 with secondary display views 1532-1533. Secondary display view 1532 presents an embodiment of a media player display view including alert status icon/selector 724 on the right side and a recent selection menu selector on the left side. Secondary display view 1533 presents an embodiment of a media player shortcut menu display view where a user has dragged the recent selection menu selector to the right to reveal and/or transition to a system shortcut display view, as described herein. FIG. 15E shows interactive animation/display views 1540 with primary display view 1542 and secondary display view 1543. Primary display view 1542 presents an embodiment of a primary interactive display view (e.g., illustrating tide and/or weather date for an area), which may be associated with a route timeline display view. Secondary display view 1543 presents an embodiment of a secondary interactive route timeline display view, which may be implemented with a tide mode timeline slider control, a weather mode timeline slider control, a sonar history slider control, and/or other timeline control described herein. For example, secondary display view 1543 may be utilized by a user to scroll (e.g., scrub) through a timeline to animate the tide and/or weather on primary display view 1542.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a user interface for a mobile structure comprising a primary display and secondary display, wherein the secondary display is disposed along and physically separate from an edge of the primary display, and wherein the secondary display comprises a touch screen display configured to render pixelated display views and receive user input as one or more user touches and/or gestures applied to a display surface of the secondary display; and
a logic device configured to communicate with the user interface, wherein the logic device is configured to:
receive user selection of an operational mode associated with the user interface and/or the mobile structure via the one or more user touches and/or gestures applied to the secondary display surface; and
render a primary display view via the primary display and/or a secondary display view via the secondary display corresponding to the received user selection and/or operational mode associated with the user interface and/or the mobile structure;
wherein:
the user selection of the operational mode comprises a touch on one of one or more message selector icons within a message list menu rendered by the secondary display, wherein each message selector icon comprises a graphic and/or graphics characteristic configured to indicate a read and/or a receipt order status of the message selector icon;
the primary display view comprises a system message window corresponding to the selected one of the message selector icons, wherein the system message window comprises message text and/or a message graphic corresponding to a system status or alert associated with the user interface and/or the mobile structure; and
the secondary display view comprises the message list menu, a message list status indicator, and/or a message list control selector.

2. The system of claim 1, wherein:
the user selection of the operational mode comprises a swipe gesture initiated at a power selector icon rendered by the secondary display;
the primary display view comprises a boot graphic associated with the user interface and/or the mobile structure; and
the secondary display view comprises an animated progress bar corresponding to a boot state of the user interface and/or the mobile structure.

3. The system of claim 1, wherein:
the user selection of the operational mode comprises a swipe gesture initiated at a power selector icon rendered by the secondary display;
the primary display view comprises a shutdown graphic associated with the user interface and/or the mobile structure; and
the secondary display view comprises the power selector icon and/or an animated shutdown graphic corresponding to a shutdown state of the user interface and/or the mobile structure.

4. The system of claim 1, wherein:
the user selection of the operational mode comprises a touch along a display parameter slider control or a swipe gesture initiated at a display parameter slider control selector, rendered by the secondary display and configured to modify a display parameter associated with the primary and/or secondary display; and
the secondary display view comprises the display parameter slider control modified according to the received user selection.

5. The system of claim 1, wherein:
the user selection of the operational mode comprises a touch on one of a selection of shortcut selector icons rendered by the secondary display, wherein the selection of shortcut selector icons comprises one or more of a screenshot capture icon, a memory card eject icon, a wireless networking configuration icon, a waypoint marker icon, a sonar system controller icon, and/or another operational mode icon associated with an operational mode of the user interface and/or the mobile structure;
the primary display view comprises an operational display view corresponding to the selected one of the shortcut selector icons and/or a shortcut list menu associated with the user interface and/or the mobile structure; and
the secondary display view comprises a display parameter slider control, a shortcut selector menu comprising the selection of shortcut selector icons, and/or a power selector icon.

6. The system of claim 1, wherein:
the user selection of the operational mode comprises a swipe gesture initiated at a power selector icon rendered by the secondary display;
the primary display view comprises a shutdown graphic associated with the user interface and/or the mobile structure; and the secondary display view comprises an animated shutdown graphic corresponding to a shutdown state of the user interface and/or the mobile structure.

7. The system of claim 1, wherein:
the mobile structure comprises a watercraft;
the user selection of the operational mode comprises a touch on one of a plurality of autopilot mode selectors and/or steering control selectors within an autopilot interactive display view rendered by the secondary display, wherein each autopilot mode selector is configured to enable or disable an operational mode of an autopilot integrated with the user interface and/or the mobile structure, and wherein each steering control selector is configured to adjust a rudder demand associated with the mobile structure; and
the secondary display view comprises the plurality of autopilot mode selectors and/or steering control selectors and a rudder position indicator bar configured to indicate a steering angle of a rudder for the mobile structure and/or the rudder demand associated with the mobile structure; and further comprising a sonar transducer assembly adapted to be mounted to the mobile structure and placed in a body of water, wherein:
the logic device is configured to receive sonar data from the sonar transducer assembly and render sonar image data corresponding to the received sonar data via the primary display;
the user selection of the operational mode comprises a touch along a sonar data history slider control or a swipe gesture initiated at a sonar data history slider control selector, rendered by the secondary display and configured to modify a sonar history display time associated with the received sonar data;
the primary display view comprises a sonar history display view based, at least in part, on the sonar data received from the sonar transducer assembly and the received user selection; and
the secondary display view comprises the sonar data history slider control modified according to the received user selection.

8. The system of claim 1, wherein:
the user selection of the operational mode comprises a touch on one of a plurality of operational mode selectors within an operational mode selector menu rendered by the secondary display, wherein each operational mode selector corresponds to an interactive display view renderable by the secondary display, and wherein the interactive display view comprises a media player interactive display view, a sonar system interactive display view, a radar system interactive display view, a route interactive display view, or an autopilot interactive display view comprising one or more selectors; and
the secondary display view comprises the interactive display view corresponding to the selected operational mode.

9. The system of claim 1, wherein:
the user selection of the operational mode comprises a touch on one of one or more waypoint icons within a waypoint icon selection menu or on a waypoint action selector rendered by the secondary display, wherein each waypoint icon comprises a graphic configured to indicate a waypoint type associated with the waypoint icon;
the primary display view comprises a mobile structure icon, a waypoint selector icon, and/or a waypoint edit menu comprising a plurality of waypoint detail editing selectors configured to modify at least one waypoint characteristic of the waypoint selector icon; and
the secondary display view comprises waypoint editing control selectors configured to save or discard the modification to the at least one waypoint characteristic; and further comprising a position and/or orientation sensor (POS) configured to provide a position and/or orientation of the user interface and/or the mobile structure, wherein:
the user selection of the operational mode comprises a touch along a route timeline slider control or a swipe gesture initiated at a route timeline slider control selector, rendered by the secondary display and configured to modify a route progress time associated with the mobile structure;
the primary display view comprises a route progress display view based, at least in part, on the received user selection and/or the position and/or orientation of the user interface and/or the mobile structure, wherein the route progress display view comprises a mobile structure position indicator comprising a graphics characteristic configured to indicate whether the user selection corresponds to a present route progress time, a route display progress indicator configured to indicate a position of the mobile structure corresponding the user selection, and/or a route progress detail window configured to indicate timing characteristics of the route display progress indicator; and
the secondary display view comprises the route timeline slider control modified according to the received user selection.

10. The system of claim 1, wherein:
the primary display view comprises an active display view window and an inactive display view window;
the secondary display view comprises a first informational or interactive display view corresponding to the active display view window of the primary display view; and
the logic device is configured to:
determine activation of the inactive display view window; and
render, via the secondary display, a second informational or interactive display view corresponding to the previously inactive display view window of the primary display view.

11. The system of claim 1, wherein:
the primary display comprises a touch screen display configured to render pixelated display views and receive user input as one or more user touches and/or gestures applied to a display surface of the primary display;
the primary and secondary displays are coplanar and rectangular, and the secondary display is disposed along a long edge of the primary display;
a long edge length of the secondary display is equal to a long edge length of the primary display, and a short edge length of the secondary display is between one fifth and one twenty-fifth a short edge length of the primary display.

12. A system comprising:
a user interface for a mobile structure comprising a primary display and secondary display, wherein the secondary display is disposed along and physically separate from an edge of the primary display, and wherein the secondary display comprises a touch screen display configured to render pixelated display views and receive user input as one or more user touches and/or gestures applied to a display surface of the secondary display; and a logic device configured to communicate with the user interface, wherein the logic device is configured to:

receive user selection of an operational mode associated with the user interface and/or the mobile structure via the one or more user touches and/or gestures applied to the secondary display surface; and render a primary display view via the primary display and/or a secondary display view via the secondary display corresponding to the received user selection and/or operational mode associated with the user interface and/or the mobile structure;

wherein:
the user selection of the operational mode comprises a dismiss alert or an engage alert swipe gesture initiated within or adjacent to an alert severity bar and/or an alert context indicator rendered by the secondary display, wherein the alert severity bar comprises a color, length, and/or graphics characteristic configured to indicate a severity of a system alert associated with the user interface and/or the mobile structure, and wherein the alert context indicator comprises text indicating the context of the system alert; and the secondary display view comprises the alert context indicator and one of an alert dismissal indicator or an alert engagement indicator corresponding to the user selection; wherein:

the user selection of the operational mode further comprises a proximity gesture associated with an informational display view rendered by the secondary display, wherein the informational display view comprises a media player informational display view, a sonar system informational display view, a radar system informational display view, a route informational display view, or an autopilot informational display view configured to indicate a respective media player status, sonar system status, route status, or autopilot status; and the secondary display view comprises an interactive display view corresponding to the informational display view rendered by the secondary display; wherein the logic device is configured to:

detect absence of the proximity gesture for a predetermined period of time; and render an updated secondary display view via the secondary display comprising the informational display view.

13. A method comprising:
receiving user selection of an operational mode associated with a mobile structure and/or a user interface for the mobile structure, wherein:

the user interface comprises a primary display and secondary display, the secondary display is disposed along and physically separate from an edge of the primary display, the secondary display comprises a touch screen display configured to render pixelated display views and receive user input as one or more user touches and/or gestures applied to a display surface of the secondary display, and the user selection is received via the one or more user touches and/or gestures applied to the secondary display surface; and rendering a primary display view via the primary display and/or a secondary display view via the secondary display corresponding to the received user selection and/or operational mode associated with the user interface and/or the mobile structure;

wherein:
the user selection of the operational mode comprises a touch on one of a plurality of operational mode selectors within an operational mode selector menu rendered by the secondary display, wherein each operational mode selector corresponds to an interactive display view renderable by the secondary display, and wherein the interactive display view comprises a media player interactive display view, a sonar system interactive display view, a radar system interactive display view, a route interactive display view, or an autopilot interactive display view comprising one or more selectors; and the secondary display view comprises the interactive display view corresponding to the selected operational mode; and wherein: the user selection of the operational mode comprises a touch on one of one or more waypoint icons within a waypoint icon selection menu or on a waypoint action selector rendered by the secondary display, wherein each waypoint icon comprises a graphic configured to indicate a waypoint type associated with the waypoint icon;

the primary display view comprises a mobile structure icon, a waypoint selector icon, and/or a waypoint edit menu comprising a plurality of waypoint detail editing selectors configured to modify at least one waypoint characteristic of the waypoint selector icon; and the secondary display view comprises waypoint editing control selectors configured to save or discard the modification to the at least one waypoint characteristic.

14. The method of claim 13, wherein:
the user selection of the operational mode comprises a swipe gesture initiated at a power selector icon rendered by the secondary display;

the primary display view comprises a shutdown graphic associated with the user interface and/or the mobile structure; and the secondary display view comprises the power selector icon and/or an animated shutdown graphic corresponding to a shutdown state of the user interface and/or the mobile structure; and wherein:

the user selection of the operational mode further comprises a swipe gesture initiated at a power selector icon rendered by the secondary display;

the primary display view comprises a boot graphic associated with the user interface and/or the mobile structure; and the secondary display view comprises an animated progress bar corresponding to a boot state of the user interface and/or the mobile structure.

15. The method of claim 13, wherein:
the user selection of the operational mode comprises a touch along a display parameter slider control or a swipe gesture initiated at a display parameter slider control selector, rendered by the secondary display and configured to modify a display parameter associated with the primary and/or secondary display; and the secondary display view comprises the display parameter slider control modified according to the received user selection; wherein:

the user selection of the operational mode further comprises a touch on one of a selection of shortcut selector icons rendered by the secondary display, wherein the selection of shortcut selector icons comprises one or more of a screenshot capture icon, a memory card eject icon, a wireless networking configuration icon, a waypoint marker icon, a potential threat icon, a sonar system controller icon, and/or another operational mode icon associated with an operational mode of the user interface and/or the mobile structure;
the primary display view comprises an operational display view corresponding to the selected one of the shortcut selector icons and/or a shortcut list menu associated with the user interface and/or the mobile structure; and
the secondary display view comprises a display parameter slider control, a shortcut selector menu comprising the selection of shortcut selector icons, and/or a power selector icon.

16. The method of claim 13, wherein:
the user selection of the operational mode comprises a touch on one of one or more message selector icons within a message list menu rendered by the secondary display, wherein each message selector icon comprises a graphic and/or graphics characteristic configured to indicate a read and/or a receipt order status of the message selector icon;
the primary display view comprises a system message window corresponding to the selected one of the message selector icons, wherein the system message window comprises message text and/or a message graphic corresponding to a system status or alert associated with the user interface and/or the mobile structure; and
the secondary display view comprises the message list menu, a message list status indicator, and/or a message list control selector; and wherein:
the user selection of the operational mode further comprises a dismiss alert or an engage alert swipe gesture initiated within or adjacent to an alert severity bar and/or an alert context indicator rendered by the secondary display, wherein the alert severity bar comprises a color, length, and/or graphics characteristic configured to indicate a severity of a system alert associated with the user interface and/or the mobile structure, and wherein the alert context indicator comprises text indicating the context of the system alert; and
the secondary display view comprises the alert context indicator and one of an alert dismissal indicator or an alert engagement indicator corresponding to the user selection.

17. The method of claim 13, wherein:
the user selection of the operational mode comprises a proximity gesture associated with an informational display view rendered by the secondary display, wherein the informational display view comprises a media player informational display view, a sonar system informational display view, a radar system informational display view, a route informational display view, or an autopilot informational display view configured to indicate a respective media player status, sonar system status, route status, or autopilot status; and
the secondary display view comprises an interactive display view corresponding to the informational display view rendered by the secondary display; wherein the method further comprises:
detecting absence of the proximity gesture for a predetermined period of time; and
rendering an updated secondary display view via the secondary display comprising the informational display view.

18. The method of claim 13, wherein:
the mobile structure comprises a watercraft;
the user selection of the operational mode comprises a touch on one of a plurality of autopilot mode selectors and/or steering control selectors within an autopilot interactive display view rendered by the secondary display, wherein each autopilot mode selector is configured to enable or disable an operational mode of an autopilot integrated with the user interface and/or the mobile structure, and wherein each steering control selector is configured to adjust a rudder demand associated with the mobile structure; and
the secondary display view comprises the plurality of autopilot mode selectors and/or steering control selectors and a rudder position indicator bar configured to indicate a steering angle of a rudder for the mobile structure and/or the rudder demand associated with the mobile structure; and further comprising receiving sonar data from a sonar transducer assembly adapted to be mounted to the mobile structure and rendering sonar image data corresponding to the received sonar data via the primary display, wherein:
the user selection of the operational mode comprises a touch along a sonar data history slider control or a swipe gesture initiated at a sonar data history slider control selector, rendered by the secondary display and configured to modify a sonar history display time associated with the received sonar data;
the primary display view comprises a sonar history display view based, at least in part, on the sonar data received from the sonar transducer assembly and the received user selection; and
the secondary display view comprises the sonar data history slider control modified according to the received user selection.

19. The method of claim 13, wherein:
the user selection of the operational mode comprises a touch along a display parameter slider control or a swipe gesture initiated at a display parameter slider control selector, rendered by the secondary display and configured to modify a display parameter associated with the primary and/or secondary display; and
the secondary display view comprises the display parameter slider control modified according to the received user selection; wherein:
the user selection of the operational mode further comprises a touch on one of a selection of shortcut selector icons rendered by the secondary display, wherein the selection of shortcut selector icons comprises one or more of a screenshot capture icon, a memory card eject icon, a wireless networking configuration icon, a waypoint marker icon, a potential threat icon, and/or a sonar system controller icon;
the primary display view comprises an operational display view corresponding to the selected one of the shortcut selector icons and/or a shortcut list menu associated with the user interface and/or the mobile structure; and
the secondary display view comprises a display parameter slider control, a shortcut selector menu comprising the selection of shortcut selector icons, and/or a power selector icon.

20. The method of claim 13, wherein:
the user selection of the operational mode comprises a touch along a route timeline slider control or a swipe gesture initiated at a route timeline slider control selector, rendered by the secondary display and configured to modify a route progress time associated with the mobile structure;

the primary display view comprises a route progress display view based, at least in part, on the received user selection and/or the position and/or orientation of the user interface and/or the mobile structure, wherein the route progress display view comprises a mobile structure position indicator comprising a graphics characteristic configured to indicate whether the user selection corresponds to a present route progress time, a route display progress indicator configured to indicate a position of the mobile structure corresponding the user selection, and/or a route progress detail window configured to indicate timing characteristics of the route display progress indicator; and the secondary display view comprises the route timeline slider control modified according to the received user selection; and wherein:

the primary display view comprises an active display view window and an inactive display view window;

the secondary display view comprises a first informational or interactive display view corresponding to the active display view window of the primary display view; and the method comprises:

determining activation of the inactive display view window; and rendering, via the secondary display, a second informational or interactive display view corresponding to the previously inactive display view window of the primary display view; and wherein:

the primary display comprises a touch screen display configured to render pixelated display views and receive user input as one or more user touches and/or gestures applied to a display surface of the primary display;

the primary and secondary displays are coplanar and rectangular, and the secondary display is disposed along a long edge of the primary display;

a long edge length of the secondary display is equal to a long edge length of the primary display, and a short edge length of the secondary display is between one fifth and one twenty-fifth a short edge length of the primary display.

* * * * *